US012677333B2

(12) United States Patent　　(10) Patent No.:　US 12,677,333 B2

Doken　　(45) Date of Patent:　Jul. 7, 2026

(54) WIRELESS DEVICE CONNECTION ESTABLISHMENT AND CONFIRMATION WITH ENHANCED VIRTUAL ASSISTANT FUNCTIONS

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 429 days.

(21) Appl. No.: 18/127,281

(22) Filed: Mar. 28, 2023

(65) Prior Publication Data

US 2024/0334505 A1　　Oct. 3, 2024

(51) Int. Cl.
*H04W 76/11*　　(2018.01)
*H04W 8/00*　　(2009.01)
*H04W 48/10*　　(2009.01)

(52) U.S. Cl.
CPC ............ *H04W 76/11* (2018.02); *H04W 8/005* (2013.01); *H04W 48/10* (2013.01)

(58) Field of Classification Search
CPC ............................... H04L 12/50; H04L 12/28
USPC ................................. 370/329, 401, 402, 403
See application file for complete search history.

(56) References Cited

U.S. PATENT DOCUMENTS 11,128,352 B2 * 9/2021 Lorca Hernando .........................
　　　　　　　　　　　　　　　　　　　H04W 28/0215
2019/0215879 A1 7/2019 Song et al.

OTHER PUBLICATIONS

"ESP32 Classic Bluetooth® AT Commands—ESP32—ESP-AT User Guide latest documentation," [retrieved on Apr. 25, 2023 from URL: https://docs.espressif.com/projects/esp-at/en/latest/esp32/AT_Command_Set/BT_AT_Commands.html.] (25 pages).

* cited by examiner

*Primary Examiner* — Dang T Ton
(74) *Attorney, Agent, or Firm* — HG LAW LLP

(57) ABSTRACT
Methods and systems are described for connecting devices in a manner that is quick and user-friendly. Enhanced audible communications are leveraged to bypass a need to reference a visual-based user interface. The enhanced audible communications are provided for smartphones having a virtual assistant layer. Connection scenarios including failure to connect, multiple users with multiple devices in a small or enclosed space, unexpected or undesired connections with nearby devices, weak signal, low data transmission, movement away from a range of the wireless connection, and the like are resolved. Parental controls are provided. Artificial intelligence systems, including neural networks, are trained for the connecting process. Models are developed for improving the connecting process. Related apparatuses, devices, techniques, and articles are also described.

22 Claims, 13 Drawing Sheets

800

810

900

910

1000

1010

1110

1100

1200

1210

1300

1310

1400

1800

1410    1420

1810

WIRELESS DEVICE CONNECTION ESTABLISHMENT AND CONFIRMATION WITH ENHANCED VIRTUAL ASSISTANT FUNCTIONS

The present disclosure relates to improved wireless connections of devices. The improved wireless connections include next generation user interfaces (UIs). The next generation UIs include systems associated with the display of content for consumption, push content in lieu of requests, and provide desirable interactive experiences for content consumption. Improved wireless connections and prompts are provided for wireless devices lacking UIs. Also, virtual assistants and wireless device commands are enhanced and leveraged to establish and confirm wireless connection with UI-less devices and deliver an improved user experience.

BACKGROUND

Conventional approaches to wireless connection cause inconvenience and frustration for users. Users do not carry UI devices (such as smartphones) with them all the time. Conventional connections of UI devices with UI-less wireless devices (such as Bluetooth (BT)-connectable wireless earbuds, sound bars, or connections of devices via wireless network protocols (Wi-Fi) such as IEEE 802.11 standards) provide insufficient feedback for a variety of real world scenarios. The scenarios include failure to connect, multiple users with multiple devices in a small or enclosed space (such as users inside of a cabin of a vehicle), unexpected or undesired connections with nearby devices, weak signal, low data transmission, movement away from a range of the wireless connection, and the like. Also, conventional virtual assistant functions are limited and relatively simplistic for these scenarios.

Consumers have adopted earbuds as the personal wireless audio consumer device of choice in droves. Over the last few years, wireless earbuds have become quite pervasive and replaced wired earbuds. It is quite common to see people conducting daily tasks and chores while wearing wireless earbuds. Users of wireless earbuds simultaneously take phone calls, listen to content (such as television, a streaming music service, a podcast, an audio book, and the like), and participate in video conference sessions (such as Zoom), and the like. Adoption of wireless earbuds is enabled by a relatively small size, convenience, comfortable fit, long battery life, and fast recharging. For instance, Apple AirPods have been released in multiple generations of device families with varying sophistication across different models. Apple AirPods have recently generated about $20 billion to $40 billion in annual sales. Earbuds are not going anywhere and will continue to be relied upon by consumers.

Another common development across the consumer electronics market is mass proliferation of virtual assistant services such as Apple Siri and Amazon Alexa. Siri and Alexa are offered in software form on various devices (such as smartphone and vehicle implementations) or provided in separate device categories (such as Apple HomePod, Amazon Echo, Google Home, and the like). Users are increasingly comfortable using virtual assistants to simplify their life and automate tasks that they would rather have the virtual assistant do, thus freeing them up to multitask. Users can also summon their smart assistant while wearing earbuds (such as AirPods) and hear the response directly in their ear. These two advances, when combined together, have improved users' productivity significantly.

On the other hand, with many wireless devices (such as BT, Wi-Fi, and the like) to connect to, life has also become complicated due to the permutations of options available. For instance, one can connect their AirPods to their iPhone, iPad, Laptop, Smart TV, HomePod, and their car. Each household today typically has multiple phones, tablets, televisions, and other BT devices (such as smart speakers, and the like) with which the earbuds may interface. Given many wireless devices across the household and most using them simultaneously (for example, for streaming audio services), many conflicts arise, and wireless devices are inadvertently automatically connected to other BT devices without user's action. With conventional approaches, users may hear and/or view media sessions that others have going on, which introduces security, privacy, and parental control issues at a minimum. In fact, conventional approaches to auto connect functionality as a convenience feature have created these security, privacy, and parental control problems and conflicts.

Earbuds, for example, may give users a warning tone that their device is connected via BT to another device (particularly for a previously paired device to BT connection); however, with conventional approaches, users do not know which device the earbud is connected to. Conventional approaches may provide a visual indication when a user's phone is in their hand; however, as noted above, since people increasingly like to user earbuds in a hands free manner and free from a base device, it is not always possible to have the base device in hand. Even with the device at hand, users do not wish to view their screen all the time. Wireless earbuds and other UI-less devices generally leverage another device that has a UI and navigable menus.

BT pairing and connection procedures have always been problematic over several generations and subject to very well documented user complaints. Especially in earlier generations, devices fail to pair, and steps involved to resolve pairing problems are cumbersome processes. In some instances, conventional approaches provide visual indicia such as blinking lights on devices. Users have difficulty deciphering or figuring out what the visual indicia actually mean in terms of progress. Even with the fifth generation of Bluetooth Low Energy (BLE) protocols, problems persist.

There are a few states of significance that BT devices get into, as pertains to the present disclosure. BT devices can be paired with each other. This means the BT devices go through a discovery process (through advertisement) and are paired by selecting each other. In certain cases, this process involves entering personal identification number (PIN) codes and the like for authentication. Once the BT devices are paired, since they electronically know each other's identity, it is easier to establish a connection. FIG. 8 depicts an upper portion of a screen 800 of an iPhone and a pairing notification 810 (e.g., "Trevor's AirPods #2 Connected") according to a conventional approach.

Once two devices are paired, they are said to be "bonded" (a term based on BT standard) meaning once they see the other's broadcasted identification (ID), they can easily trigger the connection process. For instance, a phone can quickly connect to a car's audio system once a user with the phone gets into the car. In certain cases, this is quite convenient and does not require manual UI intervention from the user. In other cases, the user has to manually initiate the connection procedure as shown, for example, in FIG. 9, which depicts a Bluetooth screen 900 of an iPhone including a list 910 of BT devices according to a conventional approach. That is, user selection of one of the BT devices on the list 910 marked "Not Connected" initiates a pairing operation.

However, a BT device (e.g., AirPods) can flip flop its connection between several devices that are close by that it had already paired with in the past. The user wearing the BT device will not be able to know which device (e.g., iPhone or iPad) that the BT device is currently connected to. For instance, FIG. 10 depicts an upper portion of a lock screen 1000 of an iPad tablet and a pairing notification 1010 (e.g., "Trevor's AirPods #2 Connected") according to a conventional approach. That is, in this example, the AirPods are connected to the iPad, because the user has moved (e.g., is walking around), and the user happens to be closer to the iPad than the iPhone despite the user not unlocking or activating the iPad. This can be a common occurrence, especially if there was, for instance, no media streaming session active on the AirPods during the initial connection session with iPhone. This complexity is at a minimum, given Apple tried to create synergies between iDevices within its ecosystem.

Moreover, if the user wants to connect AirPods to a streaming device, such as the TiVo Stream 4K device listed in FIG. 9, the pairing process is even more painful using a conventional approach. For example, FIGS. 11 to 13 depict screens 1100, 1200, 1300 of an Android TV including a Settings menu 1110, a Remotes & Accessories menu 1210, and a Device menu 1310, respectively, according to a conventional approach. With this system, the user must start at the Home screen (not shown), go to Settings (not shown), and select Remotes & Accessories (as shown in FIG. 11). From the Remotes & Accessories menu 1210, the user must select Add Accessory (as shown in FIG. 12). Then, the user must add a new device for the TiVo Stream 4K, and then connect the BT device to the newly added TiVo Stream 4K (as shown in FIG. 13). The Android TV will then search for BT devices that were paired and initiate the connection procedure. This process requires navigating multiple screens and menus. Many button presses are required to achieve the end result.

With a laptop according to a conventional approach, the pairing process involves a relatively large number of steps and screens and is typically even more complex and convoluted than that described above.

As such, a need has arisen for methods and systems that overcome these problems and deliver improved wireless device connection establishment and confirmation with enhanced virtual assistant functions.

SUMMARY

Methods, systems, devices, and non-transitory computer readable media are provided for connection of wireless devices to one or more other devices. The connection is made in a manner that is quick and user-friendly. Enhanced audible communications are leveraged to bypass a need to reference a visual-based UI. For example, for a device having a virtual assistant layer, the connecting process permits connection to a Bluetooth-connectable device, a Wi-Fi-connectable device, a Wi-Fi server, or an Internet of Things device without a need to view or interact with a screen of the device having the virtual assistant layer. The virtual assistant layer is configured with the enhanced audible communications described herein. Connection scenarios including failure to connect, multiple users with multiple devices in a small or enclosed space, unexpected or undesired connections with nearby devices, weak signal, low data transmission, movement away from a range of the wireless connection, and the like are resolved.

The connecting process includes discovery, connecting, and connected phases. In some embodiments, the enhanced audible communications occur as early as the connecting phase. Roles (e.g., primary/secondary, scanner/advertiser, initiator/advertiser, central/peripheral, client/server, and the like) are assigned to devices as appropriate to the phase of the connecting process.

Text-to-speech and speech-to-text conversions are performed as needed. In some embodiments, text-to-speech and/or speech-to-text occurs automatically and without a need to make a request to a service such as the virtual assistant for such devices.

Failure to connect scenarios are handled with appropriate enhanced audible communications. A cause of failure (e.g., a scanning function failure, a pairing function failure, a security function failure, or an advertising function failure) is determined. The enhanced audible communications include the cause of failure.

Failure scenarios relating to a strength of signal or data transmission rate between devices are provided. In some embodiments, a corrective action (e.g., movement of the user) is determined and prompted. When one or more movements are suggested, they can be provided with distance and direction.

Compatibility across a wide variety of protocols is supported. Functionality is applicable to communication technologies including Bluetooth, Wi-Fi, Internet Protocol Version 6 Over Low-Power Wireless Personal Area Networks, Bluetooth Low Energy, Global System for Mobile Communication, long range, long-term evolution, Long-Term Evolution Machine Type Communication, narrowband internet-of-things, near-field communication, Wi-Fi Peer-to-Peer, Zigbee, or Z-Wave are provided.

Content controls are supported. In some embodiments, a parent can establish a block list preventing a minor child from connecting to one or more selected devices (e.g., a block list preventing a child's access to a parent's TV in their bedroom, or the like).

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

Figures 14, 18:
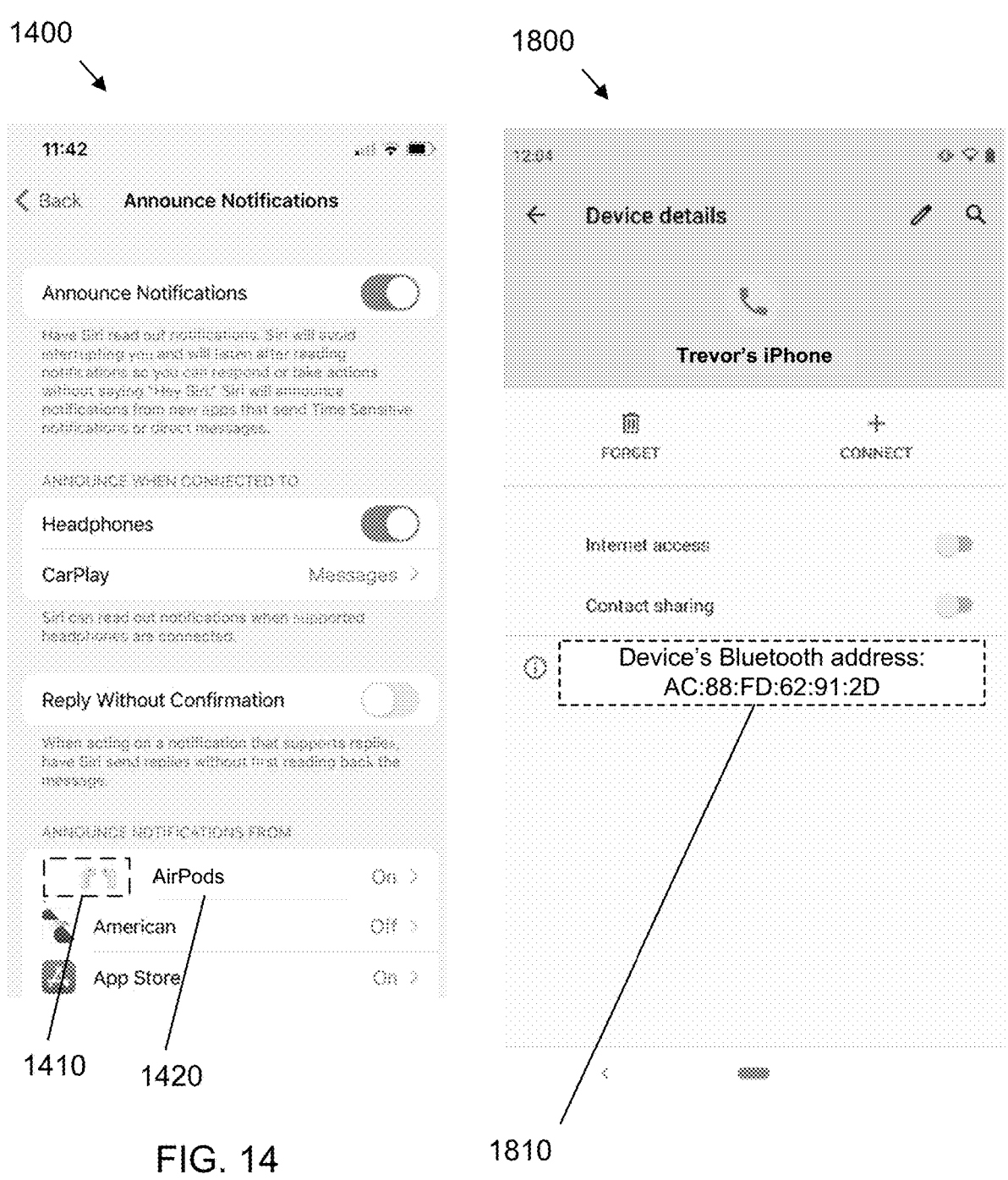
FIG. 14 depicts an enhanced Announce Notifications screen of a smartphone, in accordance with some embodiments of the disclosure.
Figure 19:
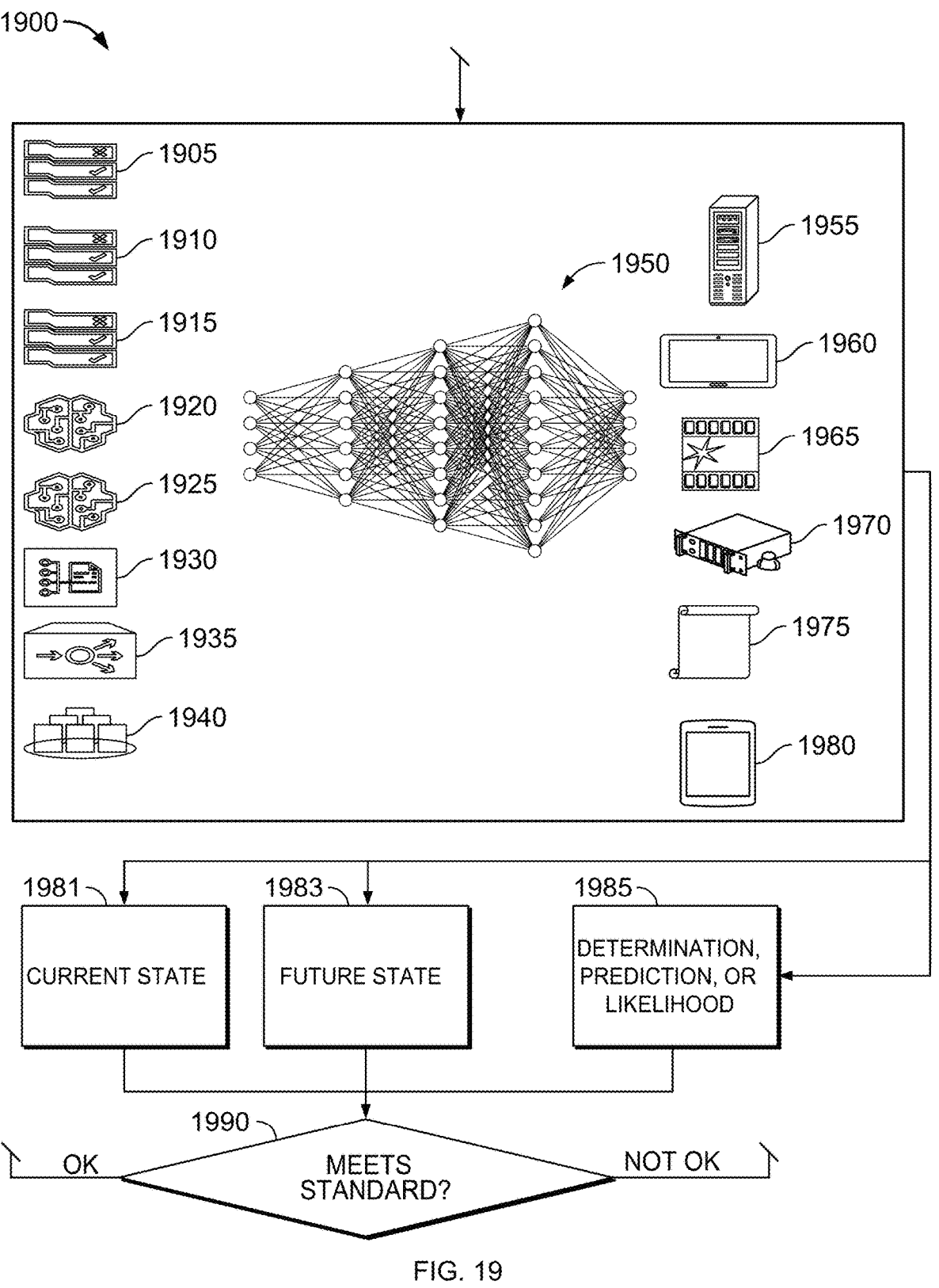
Figure 20:
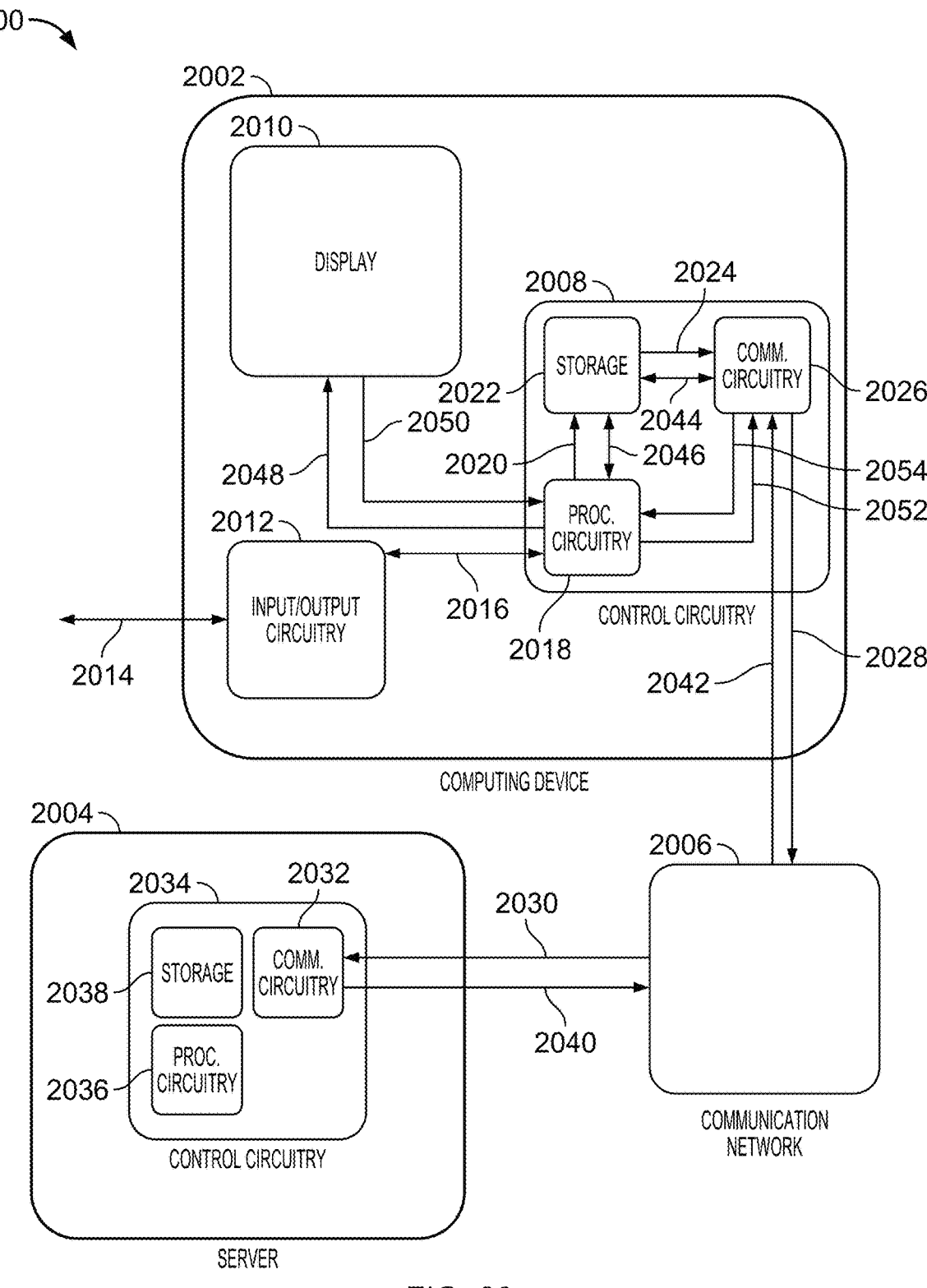

FIG. 18 depicts a BT address lookup displayed on a device details screen of an application running on a smartphone, in accordance with some embodiments of the disclosure; and FIG. 19 depicts an artificial intelligence system, in accordance with some embodiments of the disclosure; and FIG. 20 depicts a system including a server, a communication network, and a computing device for performing the methods and processes noted herein, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Enhanced notifications are provided for wireless connection of devices. The enhanced notifications allow pairing of the devices without the need for a UI. For instance, a user wearing earbuds can reliably connect to a smartphone without looking at the smartphone. Enhanced voice-controlled systems including enhanced virtual assistants are provided to facilitate the connections. Conflicts between devices of different users are resolved. When parsing commands, responses, and the like, the enhanced virtual assistants are configured to be context aware. Enhanced dialogue flows are provided that allow a user to easily override conventional automatic system pairing functions, perform functions in accordance with past user interactions, and/or reinforce user preferences. In some embodiments, the enhanced notifications provide reasons for connection problems and offer solutions to the problems. The enhanced virtual assistants are provided to differentiate among plural users and plural target devices. The enhanced dialogue flows are provided to resolve issues that arise, for instance, in a small, enclosed space (such as inside a vehicle) or in separate areas within a range of a particular wireless device. The devices configured with these features resolve potential conflicts between multiple devices having virtual assistants listening to multiple users. Enhanced communications protocols are provided to implement the enhanced functionality. The enhanced functionality is achievable, in some embodiments, without a need for a visual UI. That is, the enhanced functionality is achieved, in some embodiments, with verbal interactions alone.

While the enhanced functionality is described in non-limiting examples herein with reference to specific devices or systems (such as smartphones, earbuds, streaming service devices, and particular wireless communication protocols, whether named by brand or otherwise), it is understood that functionality is implemented on myriad devices and systems in any suitable combination. For instance, reference to a BT device pairing with a smartphone does not preclude application to Wi-Fi devices, and the like. While examples reference wireless technologies such as BT and Wi-Fi, the functionality may be implemented with other wireless technologies such as Internet Protocol Version 6 (IPv6) Over Low-Power Wireless Personal Area Networks (6LoWPAN), BLE, Global System for Mobile Communication (GSM), long range (LoRA), long-term evolution (LTE), Long-Term Evolution Machine Type Communication (LTE-M), narrow-band internet-of-things (NB-IoT), near-field communication (NFC), Wi-Fi Peer-to-Peer (Wi-Fi Direct), Zigbee, Z-Wave, and the like. While examples are given in the English language, it is understood that the present methods and systems are provided in any supported language, dialect, or accent.

Figure 7:
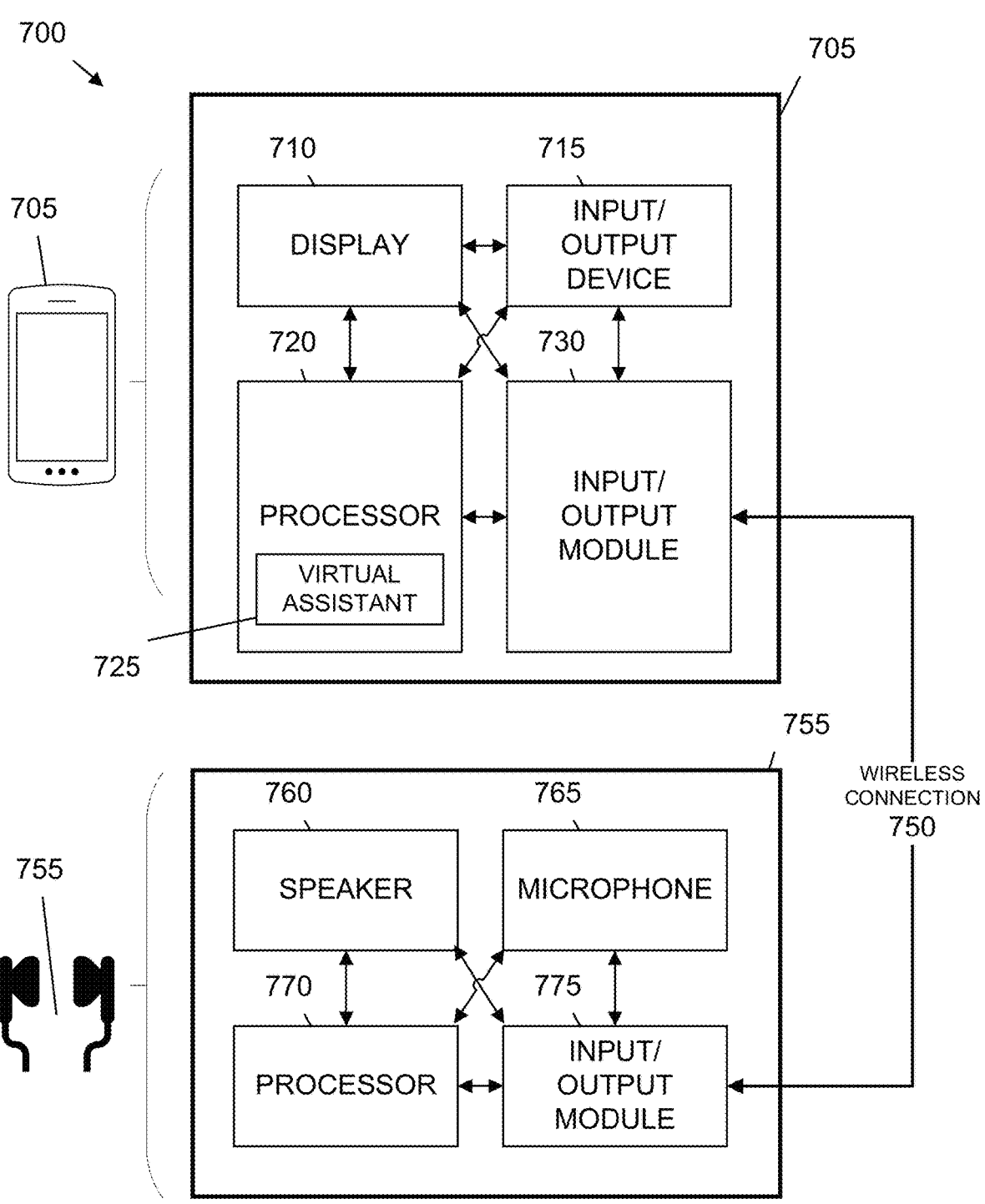
FIG. 7 depicts a system including a smartphone and earbuds wirelessly connected to each other, in accordance with some embodiments of the disclosure.
Figure 8:
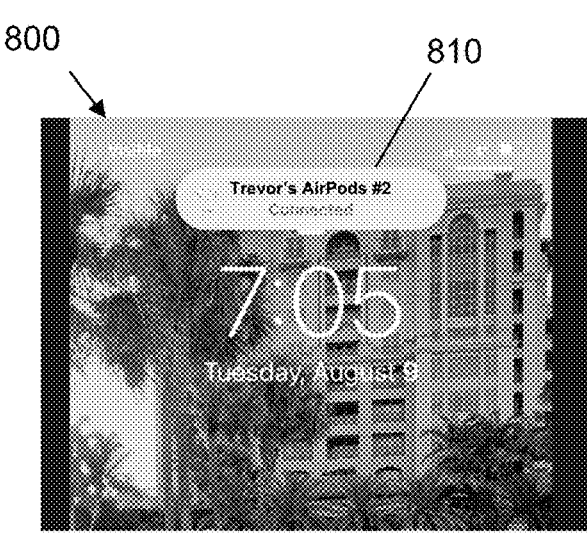
FIG. 8 depicts an upper portion of a screen of a smartphone and a pairing notification, in accordance with a conventional approach.
Figure 9:
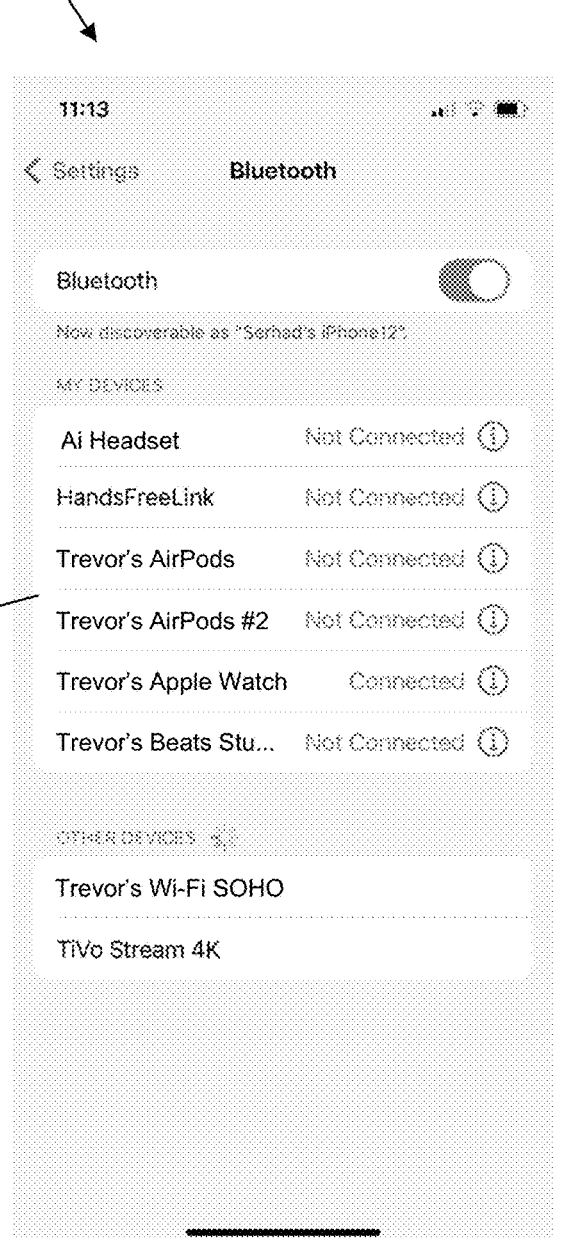
FIG. 9 depicts a Bluetooth screen of a smartphone including a list of BT devices, in accordance with a conventional approach.
Figure 10:
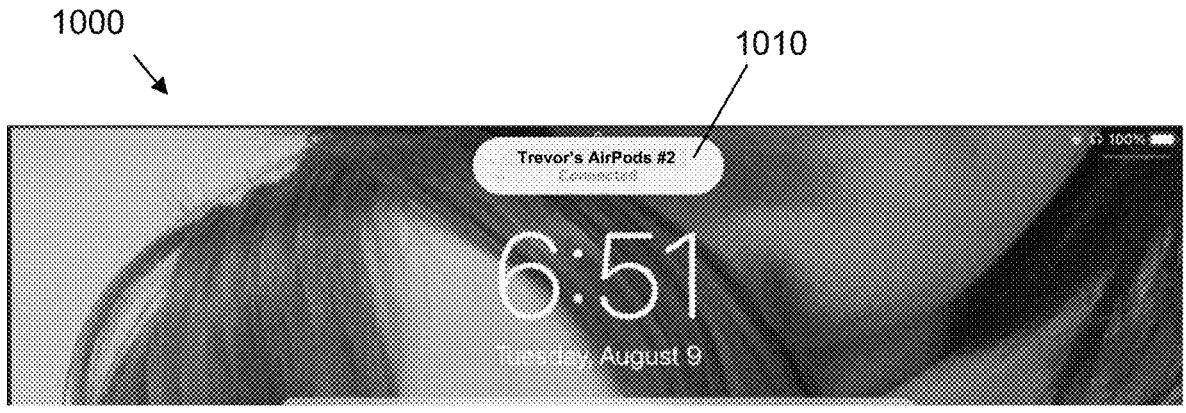
FIG. 10 depicts an upper portion of a lock screen of a tablet and a pairing notification, in accordance with a conventional approach.
Figure 11:
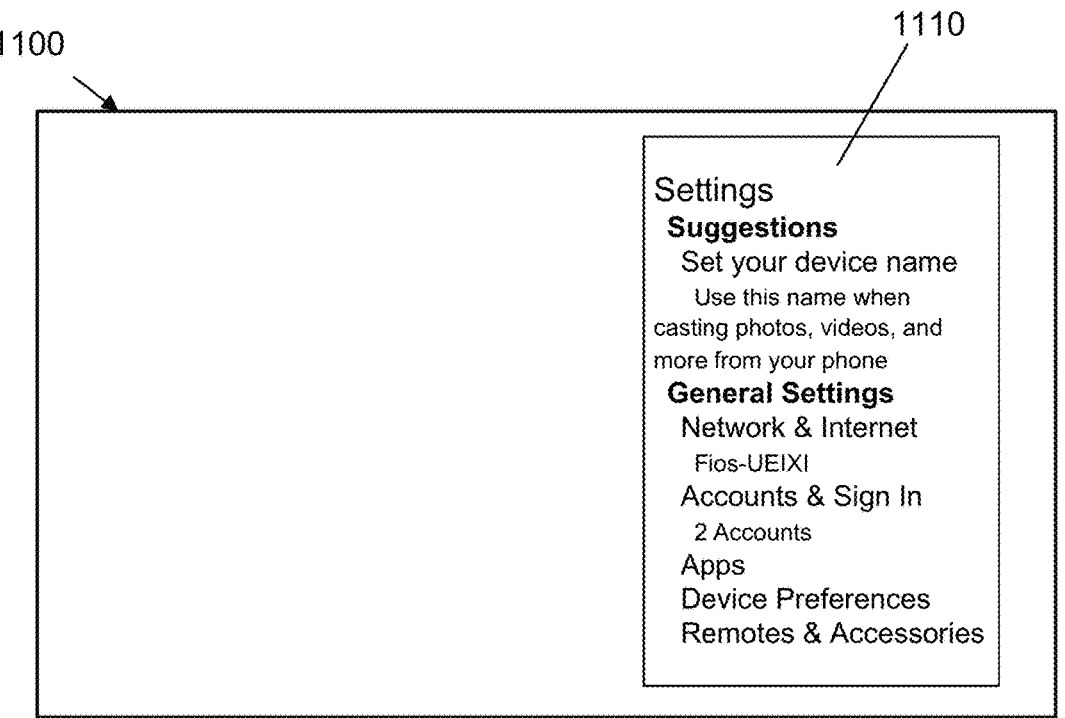
FIG. 11 depicts a screen of a display including a Settings menu, in accordance with a conventional approach.
Figure 12:
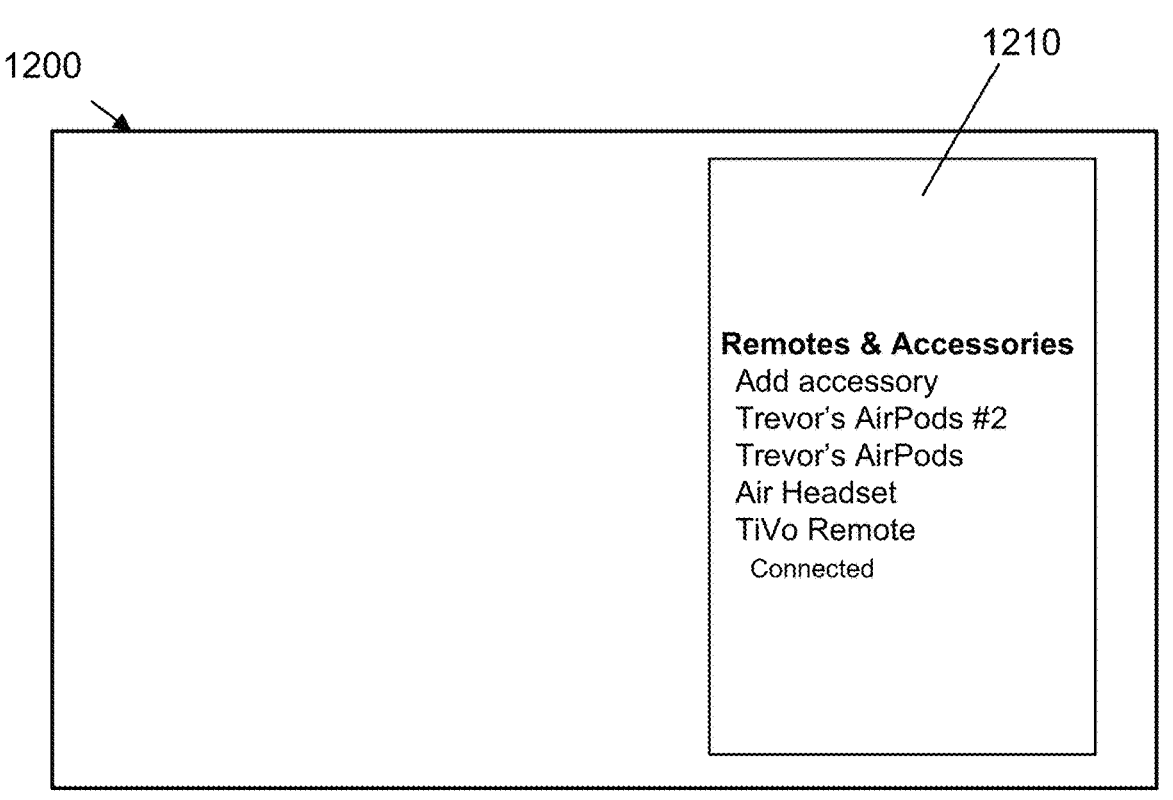
FIG. 12 depicts the screen of the display of FIG. 11 including a Remotes & Accessories menu, in accordance with a conventional approach.
Figure 13:
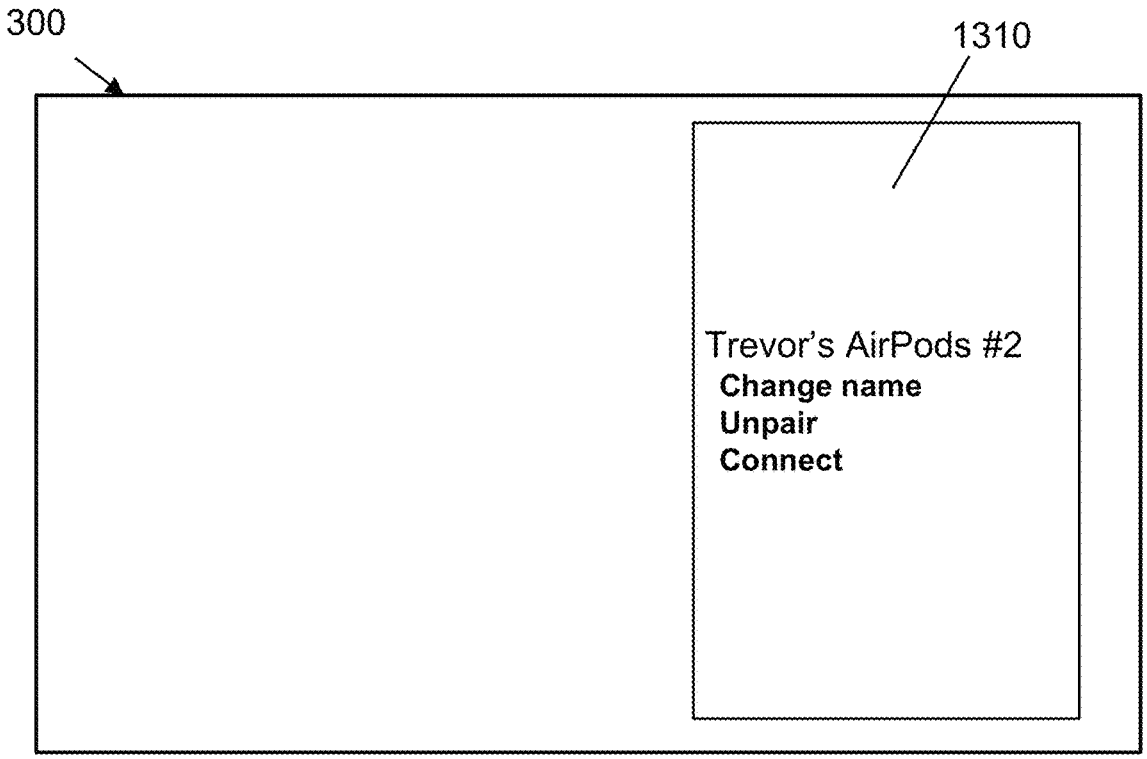
FIG. 13 depicts the screen of the display of FIG. 11 including a Device menu, in accordance with a conventional approach.

FIG. 7 depicts a system 700 including a device 705 with enhanced virtual assistant functionality (e.g., an iPhone with Siri) and a BT device 755 (e.g., AirPods) wirelessly connected to each other via a wireless connection 750 (e.g., BT). The device 705 may include any one or more of: a display 710, an input/output device 715, a processor 720 (e.g., including a virtual assistant 725 in some embodiments), and an input/output module 730. The device 705 (e.g., including the virtual assistant 725) may be configured to perform, in whole or in part, processes including but not limited to processes 1500, 1600, and 1700 of FIGS. 15 to 17, respectively. The BT device 755 may include any one or more of: a speaker 760, a microphone 765, a processor 770, and an input/output module 775. The processes 1500, 1600, 1700, or related processes enable at least one of the scenarios 100, 200, 300, 400, 500, 600, or related scenarios, as detailed herein.

In an embodiment, a connection, such as a personal area network or PAN connection (e.g., a Bluetooth connection), is established between the device 705 and the BT device 755. The connection may be or include an audio connection. The device 705 may identify a parameter or record storing data representing a device name for the device 705. The value for this parameter may be a string (e.g., "Bob's iPhone"). The device 705 may perform a text-to-speech conversion of the string (e.g., by utilizing a virtual assistant service or application) to obtain an audio representation of the device name. The device 705 may then "self-announce" by transmitting the audio representation of the device name, via the connection, to the BT device 755 to cause the audio representation to be audibly provided by the BT device 755. The audio representation may be provided as part of an audio stream from the device 705 to the BT device 755. Other audio may be provided via this audio stream if desired. For example, the device 705 may stream "Headphones now connected to Bob's iPhone" or "Headphones now connecting to Bob's iPhone" to the BT device 755.

In some instances, the user may decide that he did not want to connect the BT device 755 to the device 705. Accordingly, he may input, to the device 755, a command or request (e.g., via verbal or touch input) to connect the BT device 755 to a third device (not shown in FIG. 7). The command or request may include an identifier of the third device (e.g., "Bob's Tablet"). If the command is verbal, the device 705 may run a speech-to-text conversion to obtain a text representation of the identifier for the third device. The device 705 may perform a look-up based on the text identifier. For example, the device 705 may have, stored to memory, a record of devices to which the device 705 has previously connected or bonded. The record may include identifiers or names for these devices, as well as addresses (e.g., a network address such as a Bluetooth addresses). The device 705 may identify an address of the third device via the look up. In some instances, the device 705 may identify a name for the third device by identifying devices that are broadcasting or active and by comparing the text identifier to the broadcasted or active names. In any event, after identifying the appropriate name, address, or any other suitable information sufficient to establish a connection, the device 705 may transmit either: (i) a first command to the BT device 755 to cause the BT device 755 to connect to the third device (e.g., to establish an audio link), or (ii) a second command to the third device to cause the third device to connect to the BT device 755 (e.g., to establish an audio link). The first command may be transmitted with the identified name, address, or other suitable information for the third device, thereby enabling the BT device 755 to connect to the third device using the received information. The second command may be transmitted with a name, address, or other suitable information for the BT device 755, thereby enabling the third device to connect to the BT device 755 using the received information. After transmitting the first or second command, the device 705 and the BT device 755 may be disconnected. In some embodiments, the disconnection occurs in response to the device 705 receiving a confirmation from either the BT device 755 or the third device that the BT device 755 and the third device are connected.

Figures 1, 2:
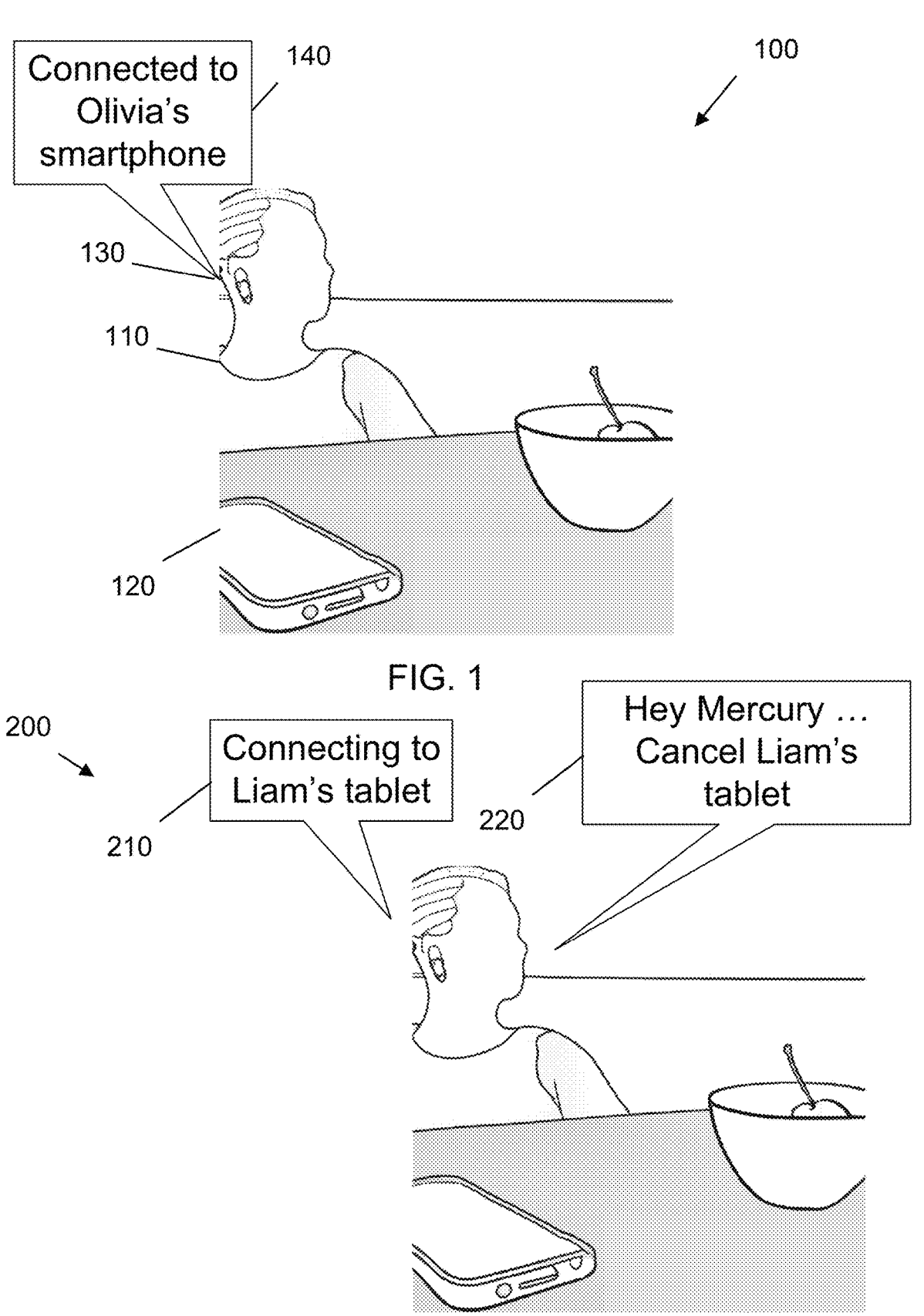
FIG. 1 depicts a user wearing a wireless device looking away from a screen of a smartphone during connection of the wireless device with the smartphone, in accordance with some embodiments of the disclosure.
FIG. 2 depicts a notification and response between the user of FIG. 1 and a virtual assistant of the smartphone of FIG. 1, in accordance with some embodiments of the disclosure.

Scenarios 100, 200, 300, 400, 500, 600, are depicted in FIGS. 1 to 7, respectively. In some embodiments, the scenarios 100 to 600 are conducted with processes such as those depicted in FIGS. 15 to 17 and described in related disclosures hereinbelow. FIG. 1 depicts the scenario 100 in which a user 110 named Olivia is wearing a wireless device 130 (e.g., BT-connectable earbuds). Olivia is looking away from a screen of a smartphone 120 during connection of the wireless device 130 with the smartphone 120. The smartphone is equipped with the enhanced functionality of the present disclosure. Instead of relying on a conventional notification provided on a screen of a conventional smartphone, Olivia receives an enhanced notification 140 (e.g., "Connected to Olivia's smartphone") via the wireless device 130 in response to successful connection of the wireless device 130 to the smartphone 120. The "Connected to" portion of the enhanced notification 140 may be standard for all users. The "Olivia's smartphone" portion of the enhanced notification 140 may be based on a lookup of a name for the device assigned by the user. Other suitable formats for the enhanced notification may be provided.

In the scenario 200 depicted in FIG. 2, Olivia's smartphone 120 is already connected to the wireless device 130. Olivia's spouse, Liam (not shown), walks into the room with a tablet (not shown). Liam had previously connected the tablet to Olivia's wireless device 130. As a result, Olivia initially receives an enhanced notification 210 (e.g., "Connecting to Liam's tablet") similar to the enhanced notification 140.

The enhanced virtual assistant present on the smartphone 120 is provided with enhanced workflows including an enhanced response flow 220. For purposes of this disclosure, "Mercury" is the name of an enhanced virtual assistant system according to the present disclosure. Mercury includes virtual assistant functionality similar to Siri and/or Alexa, and the like, and, in addition, Mercury includes enhanced functionality consistent with the present disclosure. In the scenario 200, the virtual assistant first receives a wake word (e.g., "Hey Mercury"). Conventional responses to the wake word may be provided (marked with an ellipsis (" . . . "), such as an audible tone, or verbal response (e.g., "uh-huh")). Using the enhanced functionality of Mercury, Olivia may provide the enhanced response flow 220 (e.g., "Cancel Liam's tablet"). Mercury is configured to parse and respond to other similar enhanced response flows, such as "Cancel connection to Liam's tablet," "Cancel that," and the like in a similar manner.

In response to the enhanced response flow 220, Mercury is configured to parse the enhanced response flow 220 and convert the same into an actionable, context aware sequence of events. For example, Mercury is configured to recognize that utterance of the word "Cancel" within a relatively short time (e.g., about 0 seconds to about 5 seconds) of a connection to a new device, e.g., Liam's tablet, and to recognize in the same sentence a repeated utterance (e.g., "Liam's tablet") of the device identified in the enhanced notification 210. In response to receiving the enhanced response flow 220, Mercury is configured to disconnect Liam's tablet from the wireless device 130 without a need for Olivia or Liam to pick up a device, possibly unlock the device, access the appropriate menu, and manually cancel the undesired connection. Similarly, regarding the enhanced response flow such as "Cancel that" (not shown), Mercury is configured to associate "that" as a command to cancel an action associated with the most recent notification from the smartphone 120, i.e., "Connecting to Liam's tablet."

For example, Mercury is configured to recognize Olivia's prior connection of the wireless device 130 and the smartphone 120, recognize the previous provision of the enhanced notification 210, identify Liam's tablet, and cancel the wireless connection between the wireless device 130 presently worn by Olivia and Liam's tablet. In some embodiments, Mercury is configured to receive preferences from Olivia concerning connection with various devices in the home. Mercury is configured to automatically prompt Olivia for confirmation, automatically connect, automatically block, and/or automatically disconnect devices in accordance with the preferences. In some embodiments, Mercury is configured to recognize an active session by the user wearing the wireless device 130 and predict (e.g., using prediction process 1900 disclosed herein) a likelihood that the present user of the wireless device 130 desires connection with Liam's tablet. The prediction may take into consideration past or current usage. The prediction may utilize an actively trained or pre-trained prediction system. For instance, when Olivia is listening to a podcast from the smartphone 120 with the wireless device 130, Mercury is configured to detect conditions consistent with an active listening session and determine a relatively high likelihood that Olivia does not desire connection with Liam's tablet. Mercury is also configured to detect conditions consistent with past instances where Olivia refused connection of the wireless device 130 from the smartphone 120 to Liam's tablet.

In some embodiments, connections are canceled prior to a connected phase for a pair of BT devices by referencing preferences set by the user. For instance, in a parental control embodiment, a parent is prompted to populate a block list preventing connection of a child's BT device to a parent's BT-enabled output device, e.g., a smart TV located in the parent's bedroom where adult content is displayed or transmitted. The block list is referenced before permitting BT connection to devices in the household.

Figure 3:
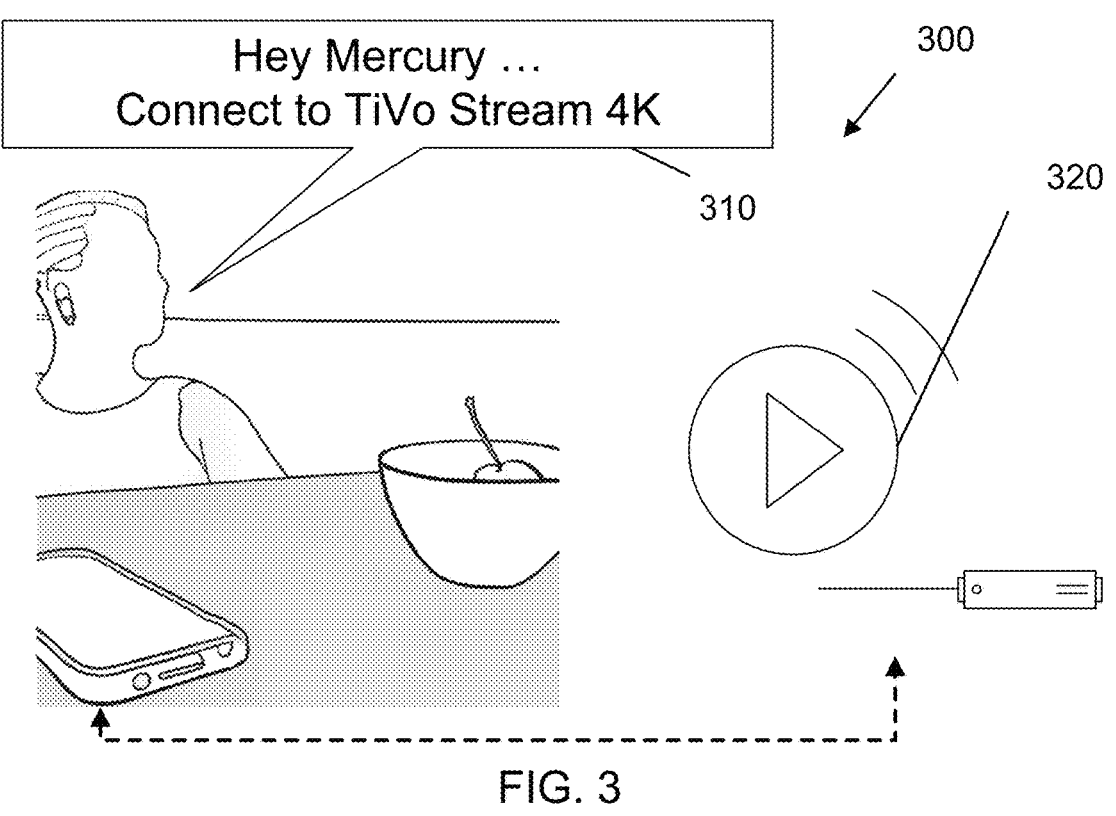
FIG. 3 depicts the user of FIG. 1 initiating a connection with a streaming device using the virtual assistant of the smartphone of FIG. 1 via the wireless device of FIG. 1, in accordance with some embodiments of the disclosure.

Turning to FIG. 3, the scenario 300 exemplifies Mercury's ability to fast switch between base devices in response to a user's request using a wireless device such as wireless earbuds. FIG. 3 depicts Olivia initiating a connection with a streaming device 320 using the virtual assistant of the smartphone 120 via the wireless device 130. The virtual assistant present on the smartphone 120 is provided with enhanced workflows including an enhanced connection request flow 310. In the scenario 300, similar to the scenario 200, Mercury first receives a wake word (e.g., "Hey Mercury"; other details of the wake word flow are omitted here for brevity). Using the enhanced functionality of Mercury, in response to Olivia providing the enhanced response flow 310 (e.g., "Connect to TiVo Stream 4K"), Mercury is configured to parse the enhanced response flow 310 and convert the same into an actionable, context aware sequence of events. For example, Mercury is configured to associate utterance of "Connect" (or similar terms) with a request to connect the wireless device 130 to another device. Mercury is configured to associate utterance of "to" as identifying an object for the request to connect, to designate "TiVo Stream 4K" as the object of the request, and to associate "TiVo Stream 4K" with a device. Mercury is configured to compare "TiVo Stream 4K" for names of devices provided on a list. Mercury is configured to perform a similarity comparison during the comparing. For instance, where "TiVo" (phonetically, "TiVo" is pronounced as "tee-voh" in standard English) is the only incidence of "TiVo" on the list, Mercury is configured to determine a likelihood that the utterance of "TiVo Stream 4K" is intended to identify a device on a list including "TiVo" as an identifier. Other methods and systems of disambiguation and term matching may be employed. Mercury is thus configured to associate the enhanced response flow 310 (e.g., "Connect to TiVo Stream 4K") with an action to connect the wireless device 130 to a device named "TiVo Stream 4K" or the like, and to perform the action. The action may be performed without further user interaction.

Figure 4:
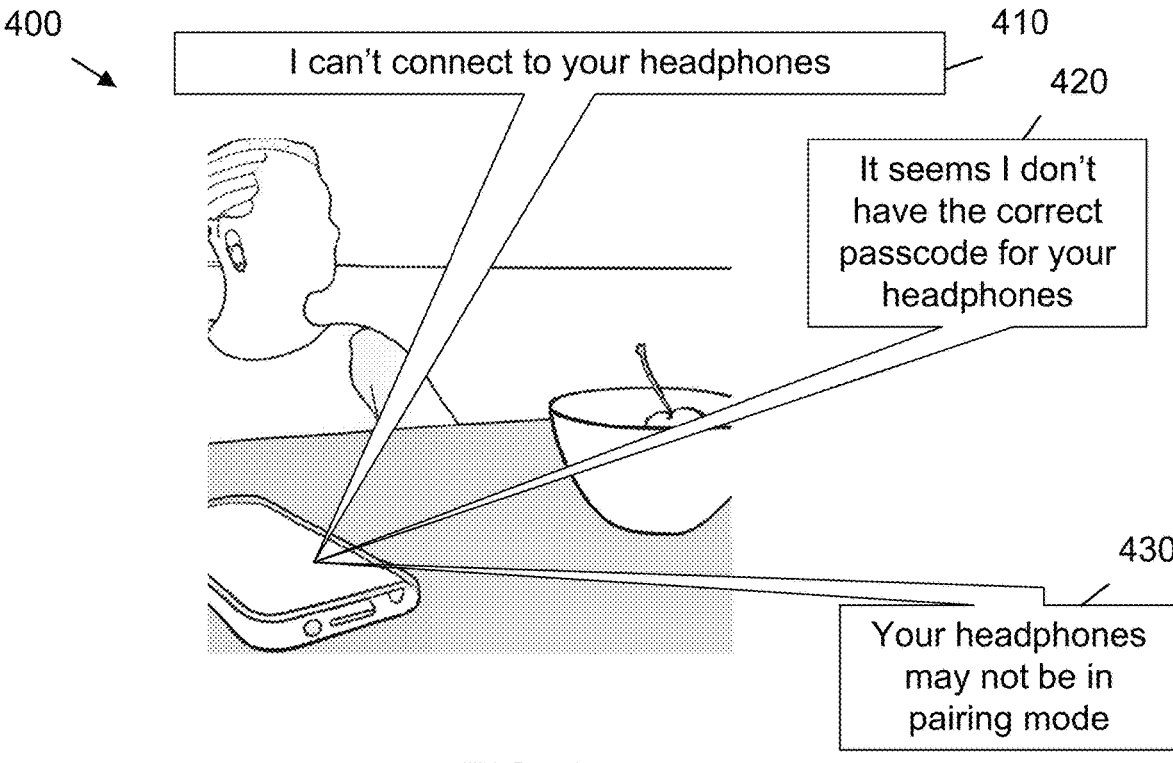
FIG. 4 depicts a series of notifications from the virtual assistant of the smartphone of FIG. 1 regarding a problem pairing with the wireless device of FIG. 1, in accordance with some embodiments of the disclosure.

FIG. 4 depicts a series of notifications from the virtual assistant of the smartphone of FIG. 1 regarding a problem pairing with the wireless device of FIG. 1. In the scenario 400, Olivia dons earbuds. The virtual assistant of the smartphone is configured to detect availability of the earbuds (e.g., the virtual assistant detects an announcement from the earbuds), but a connection problem occurs preventing connection. Without a need for Olivia to view a screen of the smartphone, the virtual assistant is configured to generate for output from the smartphone useful enhanced notifications. The enhanced notifications include at least one of a status (e.g., "I can't connect to your headphones"), a security problem (e.g., "It seems I don't have the correct passcode for your headphones"), a settings problem (e.g., "Your headphones may not be in pairing mode"), or the like.

Figures 5, 6:
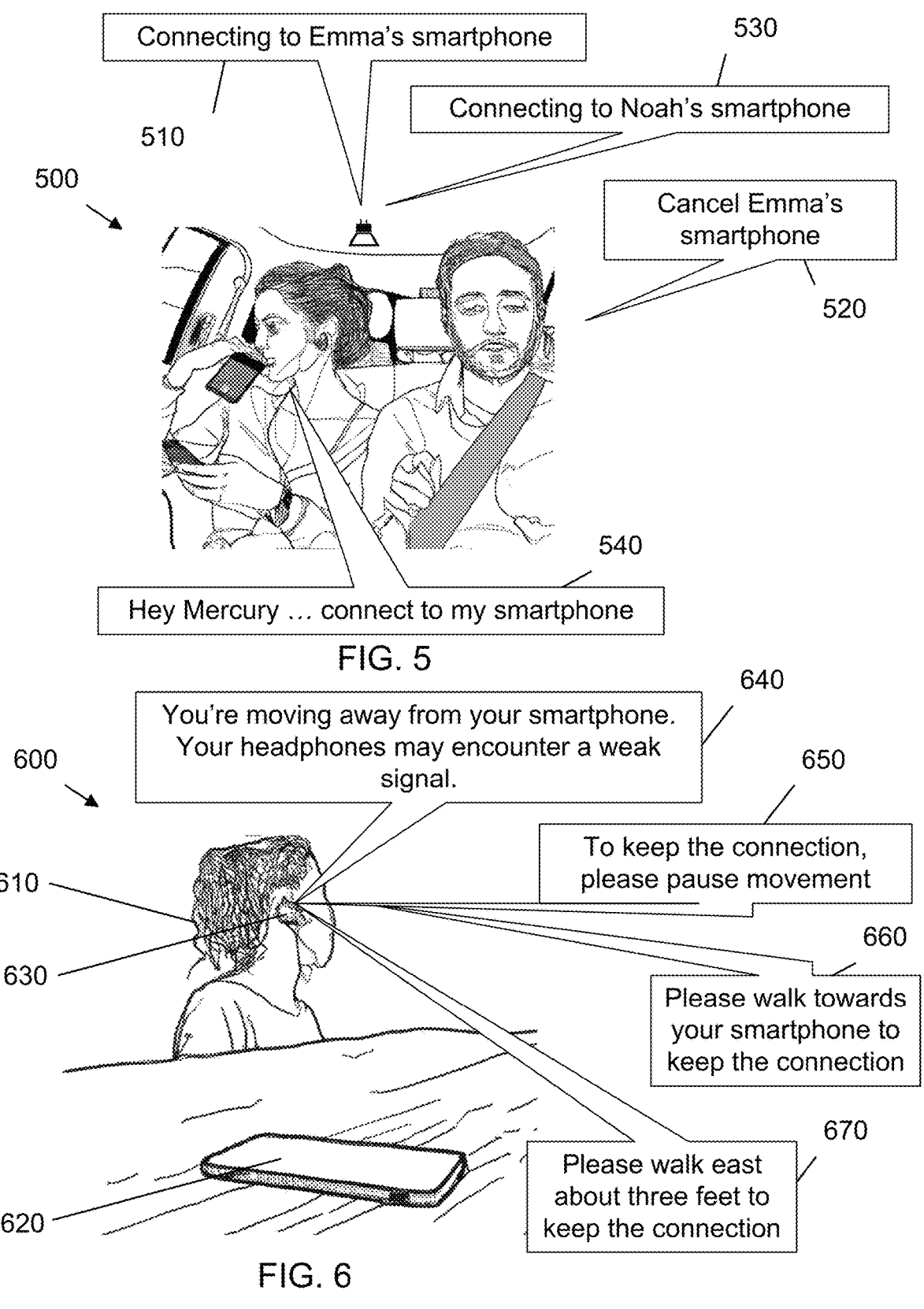
FIG. 5 depicts a pair of users in a vehicle interacting with their respective smartphones via a virtual assistant for a first user's smartphone and a virtual assistant of a second user's device connected with the vehicle, in accordance with some embodiments of the disclosure.
FIG. 6 depicts a series of notifications from a virtual assistant of a smartphone of a user moving away from the smartphone, in accordance with some embodiments of the disclosure.

FIG. 5 depicts a pair of users in a vehicle interacting with their respective smartphones via a virtual assistant for a first user's smartphone and a virtual assistant of a second user's device connected with the vehicle. In the scenario 500, Emma is in a passenger's seat and Noah is a driver's seat of the vehicle. Emma holds a first smartphone and desires connection with earbuds. Noah's second smartphone (not shown) is on the center console, and Noah desires connection with the vehicle's connected car system. In the scenario 500, Emma last paired with the vehicle. The vehicle's connected car system is configured to initiate pairing with Emma's smartphone and is configured to transmit an enhanced notification 510 (e.g., "Connecting to Emma's smartphone"). Noah desires connection with the second smartphone. In response to Noah's cancel command 520 (e.g., "Cancel Emma's smartphone"), the vehicle's connected car system is configured to cancel the connection to Emma's smartphone, scan for announcements from other BT devices in the vehicle, recognize the presence of Noah's smartphone, initiate connection, and generate for output an enhanced notification 530 (e.g., "Connecting to Noah's smartphone"). The vehicle's connected car system is configured to give priority to Noah's voice and smartphone. After a subsequent connection command 540 (e.g., "Hey Mercury . . . connect to my smartphone"), the vehicle's connected car system is configured to recognize Emma's voice, give a lower priority to a command in Emma's voice, and disregard the subsequent connection command. Emma's smartphone is configured to recognize Emma's voice and affirmatively process the subsequent connection command 540.

FIG. 6 depicts a series of notifications from a virtual assistant of a smartphone 620 of a user 610 moving away from the smartphone 620. In the scenario 600, the user 610 has already successfully paired the smartphone 620 to earbuds 630. The virtual assistant of the smartphone 620 is configured to monitor a strength of a signal between the smartphone 620 and the earbuds 630. In response to detecting a decrease in the strength of the signal, the virtual assistant of the smartphone 620 is configured to transmit enhanced notifications. The enhanced notifications include at least one of a first enhanced notification 640 (e.g., "You're moving away from your smartphone." and/or "Your head-phones may encounter a weak signal."), a second enhanced notification 650 (e.g., "To keep the connection, please pause movement"), a third enhanced notification 660 (e.g., "Please walk towards your smartphone to keep the connection"), a fourth enhanced notification 670 (e.g., "Please walk east about three feet to keep the connection" or "Please walk east about one meter to keep the connection"), or the like. In other embodiments, when the user is wearing a device equipped with its own location and position technology (e.g., GPS, an accelerometer, a gyroscope, and the like), a distance and a speed of movement of the device equipped with the location and position technology is determined to generate the fourth enhanced notification 670 relative to a location or position of the smartphone 620.

In some embodiments, a BT device is connected to a device that has a virtual assistant layer (such as Siri, Alexa, Google, and the like). As shown in FIG. 14, an Announce Notifications screen 1400 includes an enhanced notification announcement setting for AirPods (or any BT device of interest). The enhanced notification announcement includes an icon 1410 representing the BT device, i.e., in this case, an image of AirPods, and a text identifier 1420, i.e., in this case, "AirPods." Upon selection of the enhanced notification announcement, and upon successful pairing with the user's smartphone, an audible announcement, such as "Connected to Olivia's smartphone" shown in FIG. 1, is provided to the user's BT device.

In some embodiments, some functionality is set forth in protocols such as the ESP-AT Development Framework by Expressif Systems, dated Feb. 14, 2023, Release v2.3.0.0-esp32c3-408-g494d13c1, which is incorporated herein by reference. It is noted that the present disclosure references some commands set forth in the ESP-AT Development Framework; however, the enhanced systems and processes of the present disclosure are not disclosed or suggested in the Framework.

Figure 15:
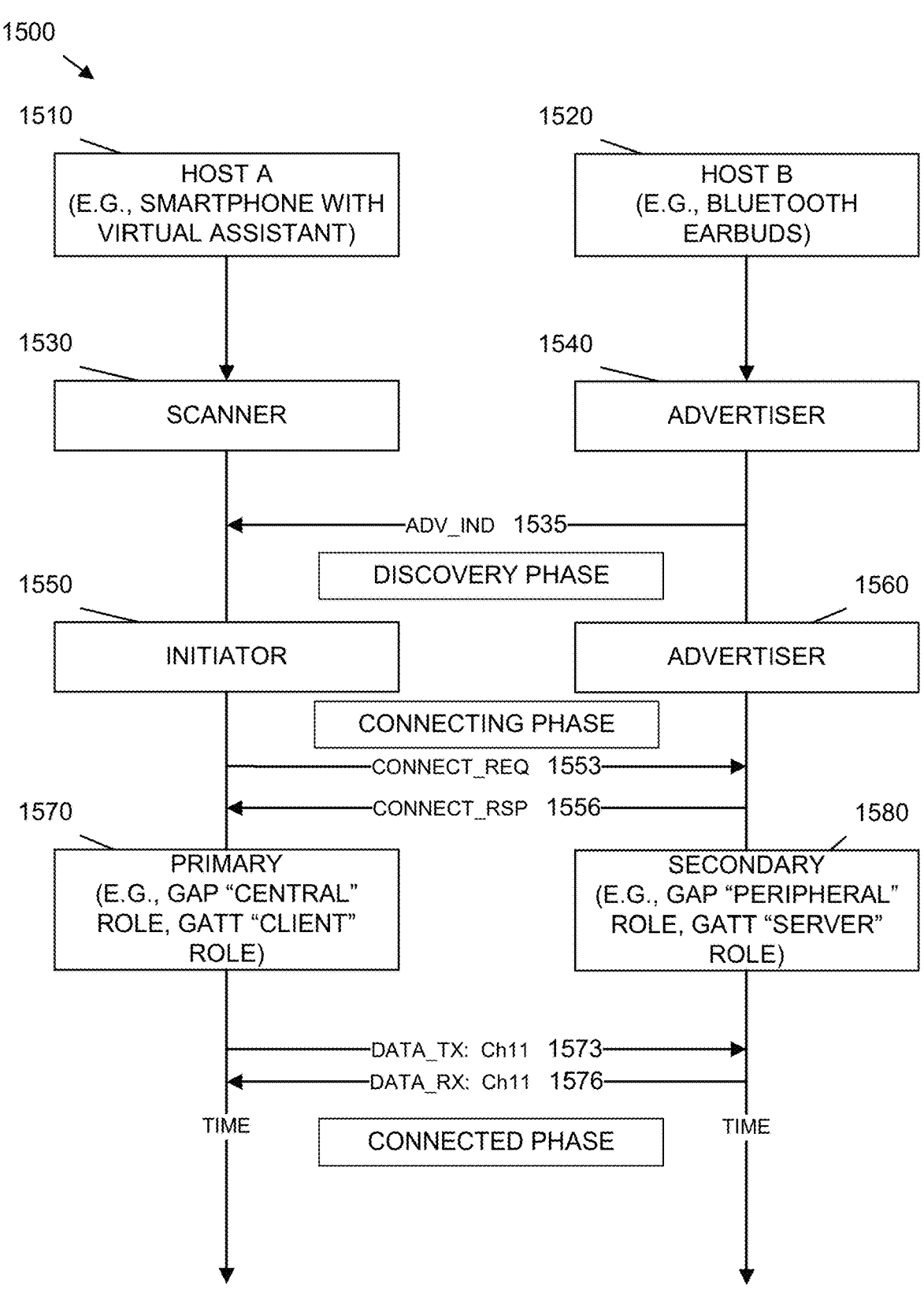
FIG. 15 depicts a connection establishment procedure for a pair of wireless devices, in accordance with some embodiments of the disclosure.

FIG. 15 depicts an enhanced BLE connection establishment process 1500. The process 1500 includes a discovery phase, a connecting phase, and a connected phase. The process 1500 includes connecting host A 1510 with host B 1520. In FIG. 15, the host A 1510 is a smartphone with a virtual assistant, and the host B 1520 is a pair of BT earbuds.

During the discovery phase, the host A 1510 is assigned as a scanner 1530, and the host B 1520 is assigned as an advertiser 1540. The advertiser 1540 is configured to send an advertiser indication (ADV_IND) 1535 to the scanner 1530.

During the connecting phase, the host A 1510 is assigned as an initiator 1550, and the host B 1520 is assigned as an advertiser 1560. In response to receiving the ADV_IND 1535, the initiator 1550 is configured to send a connection request (CONNECT_REQ) 1553 to the advertiser 1560. In response to the CONNECT_REQ 1553, the advertiser 1560 is configured to send a connection response (CONNEC-T_RSP) 1556 to the initiator 1550.

During the connected phase, the host A 1510 is assigned as a primary device 1570, and the host B 1520 is assigned as a secondary device 1580. In some embodiments, the primary device 1570 is assigned a generic access profile (GAP) central role and/or a generic attribute profile (GATT) client role, and the second device is assigned a GAP peripheral role and/or a GATT server role. In response to receiving the CONNECT_RSP 1556, the primary device 1570 is configured to send transmitter data (DATA_TX) 1573 to the secondary device 1580. In response to the DATA_TX 1573, the secondary device 1580 is configured to send receiver data (DATA_RX) 1576 to the primary device 1570. In some BLE implementations, data packets are transmitted over 40 channels, each with 2 MHz bandwidth. In this example, Channel 11 (Ch11) is utilized. In addition to BLE, other suitable data transmission systems—such as BT, 6LOWPAN, GSM, LORA, LTE, LTE-M, NB-IoT, NFC, Wi-Fi, Wi-Fi Direct, Zigbee, Z-Wave, and the like—may be employed without limitation.

Once the host A 1510 and the host B 1520 complete a connection (as shown, for example, in FIG. 15), where the host A 1510 is a smartphone equipped with a virtual assistant, and the host B is a BT device, a BT stack sends a notification request from a device driver to an OS layer of the host A 1510 to which the virtual assistant has visibility. In some embodiments, the notification request contains a device name of the host A 1510 to which the host B 1520 just connected. The device name may be a text string such as "Trevor's iPhone." The virtual assistant (e.g., such as Siri, Alexa, Google, and the like) is configured to run a text-to-speech conversion on the device name to create an audible announcement that is generated for output on the host 2 1520 (e.g., AirPods) immediately. For example, upon connection between the host A 1510 and the host B 1520, instructions corresponding to the audible notification of "Trevor's iPhone 12" are generated by the virtual assistant of the host A 1510, transmitted to the host B 1520, and generated for audio output from one or more audio output devices (e.g., left and right speakers) of the host B 1520. In some instances, the host A 1510 performs the text-to-speech conversion without using a traditional virtual assistant. For example, in some embodiments, the host A 1510 may rely on any suitable application or set of instructions to perform the text-to-speech conversion. Depending on the embodiment, the text-to-speech conversion may be performed at the host A 1510 or may be performed at different device in communication with the host A 1510 (e.g., the different device may receive a message from the host A 1510 including the device name and a request for conversion, and it may respond by transmitting to the host A 1510 audio data that the host A 1510 can use to provide an audio playback of the device name).

The discovery phase, the connecting phase, and the connected phase are labeled for convenience. In some embodiments, the discovery phase, the connecting phase, and the connected phase occur in accordance with a protocol, such as a BT protocol. As shown in FIG. 15. The discovery phase occurs when the host A 1510 receives the ADV_IND 1535, the connecting phase occurs when the initiator transmits the CONNECT_REQ 1553, and when the advertiser 1560 transmits the CONNECT_RSP 1556. The connected phase occurs when the primary device 1570 transmits the DATA_TX 1573, and when the secondary device 1580 transmits the DATA_RX 1576. Consistent with the present disclosure, any suitable transmission or reception may occur within any suitable phase and may be added, duplicated, deleted, changed, or appended in any suitable manner without limitation.

Figure 16:
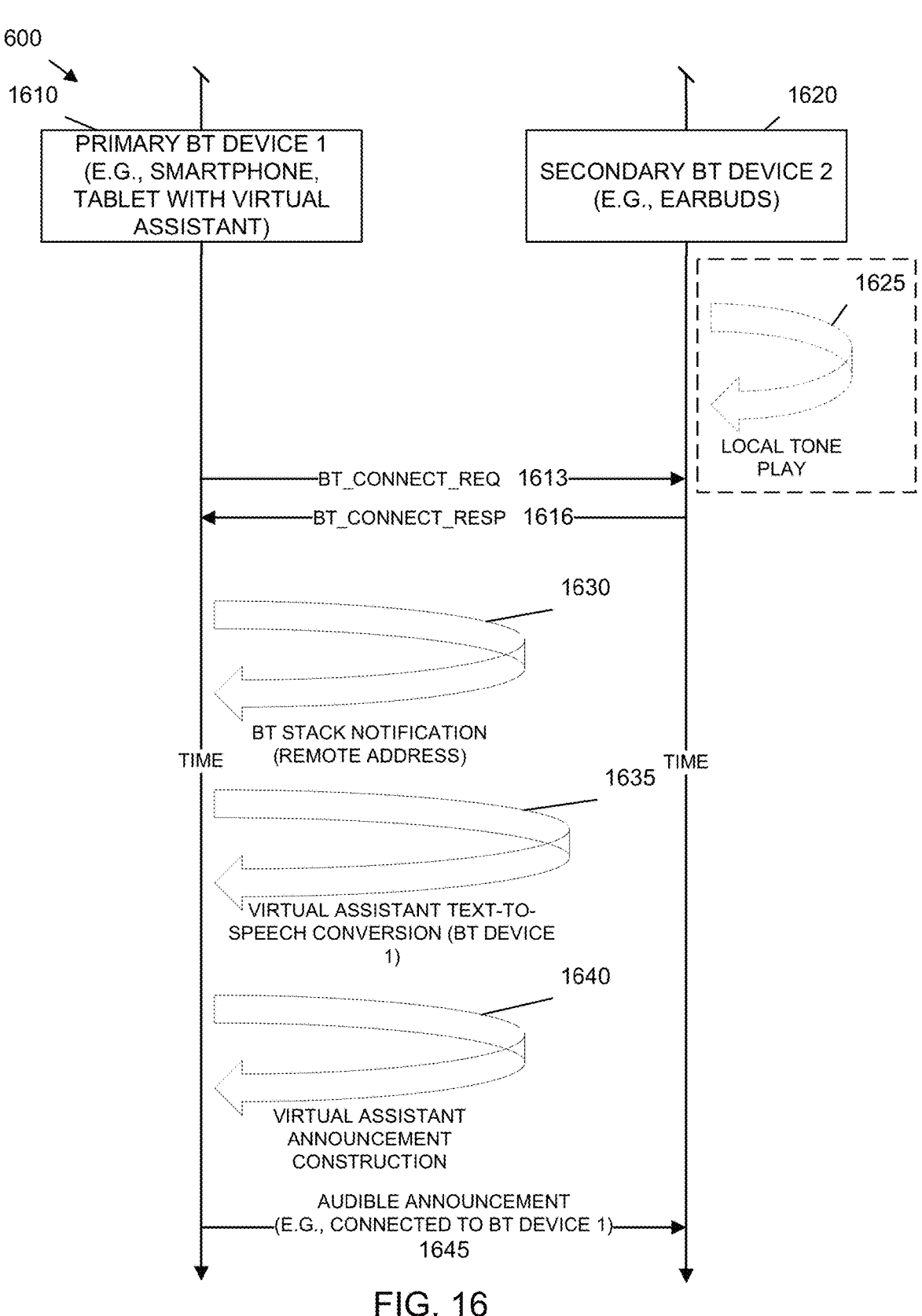
FIG. 16 depicts another connection establishment procedure for a pair of wireless devices, in accordance with some embodiments of the disclosure.

FIG. 16 depicts a process 1600 with actors and enhanced messaging. The process 1600 includes connecting a primary device 1610 with a secondary device 1620. In FIG. 16, the primary device 1610 is a device with a virtual assistant and BT connection capabilities (e.g., a smartphone or a tablet), and the secondary device 1620 is a pair of BT earbuds (e.g., AirPods). In some embodiments, the process 1600 continues from the process 1500.

Please note, in a conventional approach, upon connection of a conventional primary device and a conventional secondary device, a conventional audible local tone is automatically played on the secondary device. However, in the process 1600, an audible local tone 1625 is omitted (as denoted by dashed lines in FIG. 16). Instead, the enhanced notification flows of the present disclosure are provided. In some embodiments, in addition to the enhanced notification flows of the present disclosure, the process 1600 includes an option to automatically play the audible local tone 1625, and the option is activated by user selection of a corresponding setting. In other embodiments, in addition to the enhanced notification flows of the present disclosure, the process 1600 includes automatically playing the audible local tone 1625.

In the process 1600, in response to receiving an advertiser indication from the secondary device 1620 (not shown), the primary device 1610 is configured to send a BT connection request (BT_CONNECT_REQ) 1613 to the secondary device 1620. In response to the BT_CONNECT_REQ 1613, the secondary device 1620 is configured to send a BT connection response (BT_CONNECT_RSP) 1616 to the primary device 1610. In response to receiving the BT_CON-NECT_RSP 1616, the primary device 1610 is configured to send a BT stack notification including a remote address. The primary device 1610 is configured perform text-to-speech conversion of a name (e.g., "Trevor's iPhone") previously given by the user for the primary device 1610 (e.g., by way of the primary device 1610 instructing a virtual assistant, available at the primary device 1610, to perform the text-to-speech conversion). The virtual assistant is configured to perform announcement construction. The primary device 1610 is configured to transmit an audible announcement 1645 (e.g., in a format such as "Connected to <the name of the primary device 1610>," e.g., "Connected to Trevor's iPhone") to the secondary device 1620.

Figure 17:
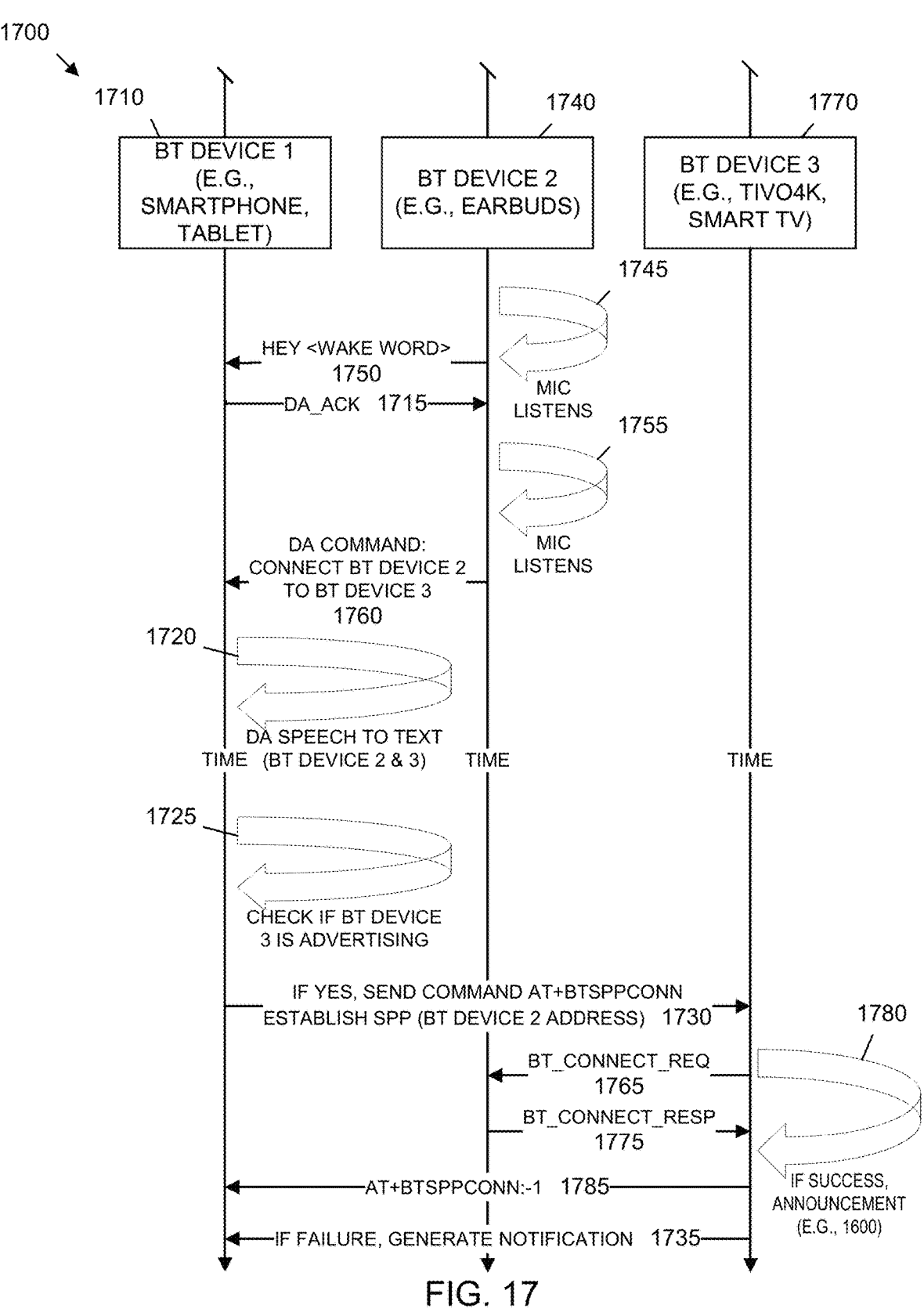
FIG. 17 depicts a connection establishment procedure for three wireless devices, in accordance with some embodiments of the disclosure.

FIG. 17 depicts a process 1700 with actors and enhanced messaging. The process 1700 includes a first connection of a first BT device (referenced in FIG. 17 as BT DEVICE 1) 1710 with a second BT device 1740 (BT DEVICE 2), a second connection of the first BT device 1710 with a third BT device 1770 (BT DEVICE 3), and a third connection of the second BT device 1740 with the third BT device 1770. In FIG. 17, the first BT device 1710 is a device with a virtual assistant and BT connection capabilities (e.g., a smartphone or a tablet), the second BT device 1740 is a pair of BT earbuds (e.g., AirPods), and the third BT device 1770 is a streaming device (e.g., TiVo Stream 4K or a smart television). Other suitable hardware configurations are within the scope of the present disclosure without limitation. In some embodiments, the process 1700 continues from the process 1500 and/or from the process 1600.

In a scenario (such as the scenario depicted in FIG. 2), after hearing a notification, such as the notification 210 (e.g., "Connecting to Liam's tablet"), Olivia is not happy about the connection of Liam's tablet to Olivia's AirPods. The second BT device 1740 is configured to listen 1745 with a microphone (MIC) for utterances by the user of the second BT device 1740. Olivia summons the virtual assistant with a wake word command 1750 such as "Hey <wake word>," e.g., "Hey Siri" for Apple products. The first BT device 1710 is configured to send a digital assistant acknowledgement (DA_ACK) 1715 (e.g., "uh-huh") to the second BT device 1740. In response to receiving the DA_ACK 1715, the second BT device 1740 is configured to listen 1755 with the MIC for utterances by the user of the second BT device 1740.

Next, Olivia gives a command (DA COMMAND) 1760 to the virtual assistant to connect to another BT device, which is unidentified at this stage, but which will upon identification be the third BT device 1770 of this example. The DA COMMAND 1760 may be, for example, in the format of "Connect <a name of the second BT device 1740 assigned by the user> to <a name of the third BT device 1770 assigned by the user>," e.g., "Connect my AirPods to the TiVo," "Connect Olivia's AirPods to the Samsung" or the like. In response to receiving the DA COMMAND 1760, the virtual assistant of the first BT device 1710 is configured to run a speech-to-text conversion 1720 on the device names (e.g., "my AirPods," "TiVo," "Samsung," and the like) from the DA COMMAND 1760. The first BT device 1710 is configured to perform a lookup process. For example, an OS system performs the lookup process. A BT address of the third BT device 1770 is identified from a suitable source, such as OS system settings. Thus, the lookup process identifies the device. See, FIG. 18, which is an example of display of a BT address 1810 (e.g., "AC:88:FD:62:91:2d") on a screen 1800 of a smartphone application where the BT address was obtained through a lookup process. In this example, the smartphone runs an Android operating system. It is noted that the enhanced BT protocol disclosed herein is compatible with all operating systems.

After the virtual assistant identifies the third BT device 1710, the first BT device 1710 is configured to check 1725 if the third BT device 1770 is active and/or advertising a name of the third BT device 1770. In response to the check 1725 determining that the third BT device 1770 is active and/or advertising, the first BT device 1710 is configured to send a connection command 1730 to the third BT device 1770 using the BT address of the second BT device 1740. In some embodiments, the connection command 1730 is an attention plus establish serial port profile (SPP) connection command (e.g., AT+BTSPPCONN). In response to the connection command 1730, the third BT device 1770 is configured to send a BT connection request (BT_CONNEC-T_REQ) 1765 to the second BT device 1740. In response to the BT_CONNECT_REQ 1765, the second BT device 1740 is configured to send a BT connection response (BT_CON-NECT_RSP) 1715 to the third BT device 1770.

If the connection between the second BT device 1740 and the third BT device 1770 is successful, then a connection command is processed by an application programming interface (API) on the second BT device 1740 and returns an OK status. In some embodiments, the connection command is +BTSPPCONN:<conn_index>, <remote_address>, where <conn_index> is a connection index and <remote_address> is a remote address of a device. In response to the OK status, the virtual assistant of the third BT device 1770 is configured to play an announcement 1780 (e.g., "Connected to TiVo" or the like) for output on the second BT device 1740. The announcement may be similar to the audible announcement 1645 of the process 1600 as appropriate for the connection of the second BT device 1740 and the third BT device 1770.

If the connection between the second BT device 1740 and the third BT device 1770 is unsuccessful, then a failed connection notification (e.g., +BTSPPCONN:−1) 1785 is sent from the third BT device 1770 to the first BT device 1710. If the connection between the second BT device 1740 and the third BT device 1770 is unsuccessful, then a notification 1735 (e.g., "Failed to connect to the TiVo" or the like) is generated by the virtual assistant of the first BT device 1710 for output on the second BT device 1740. The announcement may be similar to the audible announcement of the process 1600 as appropriate for the first BT device 1710, the second BT device, and the third BT device 1770.

In some embodiments, the second BT device 1740 is a primary device and the third BT device 1770 is a secondary device. Then, the lookup of the BT address is sent to the second BT device (e.g., AirPods). BT AT commands are sent to the second BT device, which will be needed to be queued up before any execution. The BT AT commands include, for example, an SPP connection (e.g., AT+BTSPPCONN: query/establish SPP connection) regarding the second BT device 1740, and an SPP disconnection (e.g., AT+BTSPP-CONN:−1: End SPP connection) using the remote address of the first BT device 1710.

In some embodiments, in the general context of the process 1700, disconnections utilize the BT address of a first device with a virtual assistant (e.g., iPhone). Established connections utilize the BT address of a third device (e.g., TiVo4K). The BT device will receive commands, queue the commands up in a buffer, first execute the SPP disconnection, and then execute the SPP connection, respectively. This connection then disconnection sequence ensures that both commands are received by a second BT device before the SPP disconnection is executed. In some embodiments, executing the SPP connection may be sufficient when the third BT Device connecting to the second BT device results in disconnection from the first device with the virtual assistant.

In some embodiments, the second BT device 1740 is any BT-enabled device such as a virtual assistant, a smart appliance (like a smart lamp), and the like.

In some embodiments, the second BT device 1740 runs virtual assistant functionality on itself. In that case, all the audible announcement procedures described for the process 1600 are conducted on the second BT device 1740. That is, the first BT device 1710 is not necessary when the second BT device 1740 has built-in virtual assistant functionality.

Predictive Model

Throughout the present disclosure, determinations, predictions, likelihoods, and the like are determined with one or more predictive models. For example, FIG. 19 depicts a predictive model. A prediction process 1900 includes a predictive model 1950 in some embodiments. The predictive model 1950 receives as input various forms of data about one, more or all the users, media content items, devices, and data described in the present disclosure. The predictive model 1950 performs analysis based on at least one of hard rules, learning rules, hard models, learning models, usage data, load data, analytics of the same, metadata, or profile information, and the like. The predictive model 1950 outputs one or more predictions of a future state of any of the devices described in the present disclosure. A load-increasing event is determined by load-balancing techniques, e.g., least connection, least bandwidth, round robin, server response time, weighted versions of the same, resource-based techniques, and address hashing. The predictive model 1950 is based on input including at least one of a hard rule 1905, a user-defined rule 1910, a rule defined by a content provider 1915, a hard model 1920, or a learning model 1925.

The predictive model 1950 receives as input usage data 1930. The predictive model 1950 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 1950 receives as input load-balancing data 1935. The predictive model 1950 is based on at least one of load data of the display device, load data of the requesting media device, load data of the media content item, load data of the communication system or network, load data of the profile, or load data of the media device.

The predictive model 1950 receives as input metadata 1940. The predictive model 1950 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 1950 is trained with data. The training data is developed in some embodiments using one or more data techniques including but not limited to data selection, data sourcing, and data synthesis. The predictive model 1950 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 1950 is trained in some embodiments with one or more machine learning approaches including but not limited to supervised learning, unsupervised learning, semi-supervised learning, reinforcement learning, and dimensionality reduction. The predictive model 1950 in some embodiments includes regression analysis including analysis of variance (ANOVA), linear regression, logistic regression, ridge regression, and/or time series. The predictive model 1950 in some embodiments includes classification analysis including decision trees and/or neural networks. In FIG. 19, a depiction of a multi-layer neural network is provided as a non-limiting example of a predictive model 1950, the neural network including an input layer (left side), three hidden layers (middle), and an output layer (right side) with 32 neurons and 192 edges, which is intended to be illustrative, not limiting. The predictive model 1950 is based on data engineering and/or modeling techniques. The data engineering techniques include exploration, cleaning, normalizing, feature engineering, and scaling. The modeling techniques include model selection, training, evaluation, and tuning. The predictive model 1950 is operationalized using registration, deployment, monitoring, and/or retraining techniques.

The predictive model 1940 is configured to output results to a device or multiple devices. The device includes means for performing one, more, or all the features referenced herein of the methods, processes, and outputs of one or more of FIGS. 7 and 14 to 18, inclusive, in any suitable combination. The device is at least one of a server 1955, a tablet 1960, a media display device 1965, a network-connected computer 1970, a media device 1975, a computing device 1980, or the like.

The predictive model 1950 is configured to output a current state 1981, and/or a future state 1983, and/or a determination, a prediction, or a likelihood 1985, and the like. The current state 1981, and/or the future state 1983, and/or the determination, the prediction, or the likelihood 1985, and the like may be compared 1990 to a predetermined or determined standard. In some embodiments, the standard is satisfied (1990=OK) or rejected (1990=NOT OK). If the standard is satisfied or rejected, the predictive process 1900 outputs at least one of the current state, the future state, the determination, the prediction, or the likelihood to any device or module disclosed herein.

Communication System

FIG. 20 depicts a block diagram of system 2000, in accordance with some embodiments. The system is shown to include computing device 2002, server 2004, and a communication network 2006. It is understood that while a single instance of a component may be shown and described relative to FIG. 20, additional embodiments of the component may be employed. For example, server 2004 may include, or may be incorporated in, more than one server. Similarly, communication network 2006 may include, or may be incorporated in, more than one communication network. Server 2004 is shown communicatively coupled to computing device 2002 through communication network 2006. While not shown in FIG. 20, server 2004 may be directly communicatively coupled to computing device 2002, for example, in a system absent or bypassing communication network 2006.

Communication network 2006 may include one or more network systems, such as, without limitation, the Internet, LAN, Wi-Fi, wireless, or other network systems suitable for audio processing applications. The system 2000 of FIG. 20 excludes server 2004, and functionality that would otherwise be implemented by server 2004 is instead implemented by other components of the system depicted by FIG. 20, such as one or more components of communication network 2006. In still other embodiments, server 2004 works in conjunction with one or more components of communication network 2006 to implement certain functionality described herein in a distributed or cooperative manner. Similarly, the system depicted by FIG. 20 excludes computing device 2002, and functionality that would otherwise be implemented by computing device 2002 is instead implemented by other components of the system depicted by FIG. 20, such as one or more components of communication network 2006 or server 2004 or a combination of the same. In other embodiments, computing device 2002 works in conjunction with one or more components of communication network 2006 or server 2004 to implement certain functionality described herein in a distributed or cooperative manner.

Computing device 2002 includes control circuitry 2008, display 2010 and input/output (I/O) circuitry 2012. Control circuitry 2008 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 2008 in turn includes communication circuitry 2026, storage 2022 and processing circuitry 2018. Either of control circuitry 2008 and 2034 may be utilized to execute or perform any or all the methods, processes, and outputs disclosed herein, or any combination of steps thereof (e.g., as enabled by processing circuitries 2018 and 2036, respectively).

In addition to control circuitry 2008 and 2034, computing device 2002 and server 2004 may each include storage (storage 2022, and storage 2038, respectively). Each of storages 2022 and 2038 may be an electronic storage device. As referred to herein, the phrase "electronic storage device"

or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2022 and 2038 may be used to store several types of content, metadata, and/or other types of data. Non-volatile memory may also be used (e.g., to launch a boot-up routine and other instructions). Cloud-based storage may be used to supplement storages 2022 and 2038 or instead of storages 2022 and 2038. In some embodiments, a user profile and messages corresponding to a chain of communication may be stored in one or more of storages 2022 and 2038. Each of storages 2022 and 2038 may be utilized to store commands, for example, such that when each of processing circuitries 2018 and 2036, respectively, are prompted through control circuitries 2008 and 2034, respectively. Either of processing circuitries 2018 or 2036 may execute any of the methods, processes, and outputs disclosed herein, or any combination of steps thereof.

In some embodiments, control circuitry 2008 and/or 2034 executes instructions for an application stored in memory (e.g., storage 2022 and/or storage 2038). Specifically, control circuitry 2008 and/or 2034 may be instructed by the application to perform the functions discussed herein. In some embodiments, any action performed by control circuitry 2008 and/or 2034 may be based on instructions received from the application. For example, the application may be implemented as software or a set of and/or one or more executable instructions that may be stored in storage 2022 and/or 2038 and executed by control circuitry 2008 and/or 2034. The application may be a client/server application where only a client application resides on computing device 2002, and a server application resides on server 2004.

The application may be implemented using any suitable architecture. For example, it may be a stand-alone application wholly implemented on computing device 2002. In such an approach, instructions for the application are stored locally (e.g., in storage 2022), and data for use by the application is downloaded on a periodic basis (e.g., from an out-of-band feed, from an Internet resource, or using another suitable approach). Control circuitry 2008 may retrieve instructions for the application from storage 2022 and process the instructions to perform the functionality described herein. Based on the processed instructions, control circuitry 2008 may determine a type of action to perform in response to input received from I/O circuitry 2012 or from communication network 2006.

In client/server-based embodiments, control circuitry 2008 may include communication circuitry suitable for communicating with an application server (e.g., server 2004) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2006). In another example of a client/server-based application, control circuitry 2008 runs a web browser that interprets web pages provided by a remote server (e.g., server 2004). For example, the remote server may store the instructions for the application in a storage device.

The remote server may process the stored instructions using circuitry (e.g., control circuitry 2034) and/or generate displays. Computing device 2002 may receive the displays generated by the remote server and may display the content of the displays locally via display 2010. For example, display 2010 may be utilized to present a string of characters. This way, the processing of the instructions is performed remotely (e.g., by server 2004) while the resulting displays, such as the display windows described elsewhere herein, are provided locally on computing device 2004. Computing device 2002 may receive inputs from the user via input/output circuitry 2012 and transmit those inputs to the remote server for processing and generating the corresponding displays.

Alternatively, computing device 2002 may receive inputs from the user via input/output circuitry 2012 and process and display the received inputs locally, by control circuitry 2008 and display 2010, respectively. For example, input/output circuitry 2012 may correspond to a keyboard and/or a set of and/or one or more speakers/microphones which are used to receive user inputs (e.g., input as displayed in a search bar or a display of FIG. 20 on a computing device). Input/output circuitry 2012 may also correspond to a communication link between display 2010 and control circuitry 2008 such that display 2010 updates in response to inputs received via input/output circuitry 2012 (e.g., simultaneously update what is shown in display 2010 based on inputs received by generating corresponding outputs based on instructions stored in memory via a non-transitory, computer-readable medium).

Server 2004 and computing device 2002 may transmit and receive content and data such as media content via communication network 2006. For example, server 2004 may be a media content provider, and computing device 2002 may be a smart television configured to download or stream media content, such as a live news broadcast, from server 2004. Control circuitry 2034, 2008 may send and receive commands, requests, and other suitable data through communication network 2006 using communication circuitry 2032, 2026, respectively. Alternatively, control circuitry 2034, 2008 may communicate directly with each other using communication circuitry 2032, 2026, respectively, avoiding communication network 2006.

It is understood that computing device 2002 is not limited to the embodiments and methods shown and described herein. In nonlimiting examples, computing device 2002 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2002 receives user input 2014 at input/output circuitry 2012. For example, computing device 2002 may receive a user input such as a user swipe or user touch. It is understood that computing device 2002 is not limited to the embodiments and methods shown and described herein.

User input 2014 may be received from a user selection-capturing interface that is separate from device 2002, such as a remote-control device, trackpad, or any other suitable user movement-sensitive, audio-sensitive or capture devices, or as part of device 2002, such as a touchscreen of display 2010. Transmission of user input 2014 to computing device 2002 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 2012 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 2018 may receive user input 2014 from input/output circuitry 2012 using communication path 2016. Processing circuitry 2018 may convert or translate the received user input 2014 that may be in the form of audio data, visual data, gestures, or movement to digital signals. In some embodiments, input/output circuitry 2012 performs the translation to digital signals. In some embodiments, processing circuitry 2018 (or processing circuitry 2036, as the case may be) conducts disclosed processes and methods.

Processing circuitry 2018 may provide requests to storage 2022 by communication path 2020. Storage 2022 may provide requested information to processing circuitry 2018 by communication path 2046. Storage 2022 may transfer a request for information to communication circuitry 2026 which may translate or encode the request for information to a format receivable by communication network 2006 before transferring the request for information by communication path 2028. Communication network 2006 may forward the translated or encoded request for information to communication circuitry 2032, by communication path 2030.

At communication circuitry 2032, the translated or encoded request for information, received through communication path 2030, is translated or decoded for processing circuitry 2036, which will provide a response to the request for information based on information available through control circuitry 2034 or storage 2038, or a combination thereof. The response to the request for information is then provided back to communication network 2006 by communication path 2040 in an encoded or translated format such that communication network 2006 forwards the encoded or translated response back to communication circuitry 2026 by communication path 2042.

At communication circuitry 2026, the encoded or translated response to the request for information may be provided directly back to processing circuitry 2018 by communication path 2054 or may be provided to storage 2022 through communication path 2044, which then provides the information to processing circuitry 2018 by communication path 2046. Processing circuitry 2018 may also provide a request for information directly to communication circuitry 2026 through communication path 2052, where storage 2022 responds to an information request (provided through communication path 2020 or 2044) by communication path 2024 or 2046 that storage 2022 does not contain information pertaining to the request from processing circuitry 2018.

Processing circuitry 2018 may process the response to the request received through communication paths 2046 or 2054 and may provide instructions to display 2010 for a notification to be provided to the users through communication path 2048. Display 2010 may incorporate a timer for providing the notification or may rely on inputs through input/output circuitry 2012 from the user, which are forwarded through processing circuitry 2018 through communication path 2048, to determine how long or in what format to provide the notification. When display 2010 determines the display has been completed, a notification may be provided to processing circuitry 2018 through communication path 2050.

The communication paths provided in FIG. 20 between computing device 2002, server 2004, communication network 2006, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the present disclosure the non-limiting term "virtual assistant" is provided, which may refer to a digital assistant, a smart assistant, an intelligent virtual assistant, an intelligent personal assistant, or related technology without limitation.

Also throughout the present disclosure, it is understood that Wi-Fi-enabled embodiments are within the scope of the disclosure. The Wi-Fi embodiments are based on the BT-enabled embodiments.

As used herein, the term "simultaneous" and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one embodiment is described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This specification discloses embodiments, which include, but are not limited to, the following items:

Item 1. A method for connecting a first device to a second device, the method comprising:

receiving, at the first device, a discovery phase signal from the second device;

transmitting, from the first device, a connecting phase signal to the second device;

receiving, at the first device, a response to the connecting phase signal from the second device;

transmitting, from the first device, a connected phase signal including transmission data to the second device;

receiving, at the first device, a response to the connected phase signal including receiving data from the second device; and transmitting from the first device an audible announcement to the second device, the audible announcement including an identification of the first device.

Item 2. The method of item 1, wherein the first device includes a virtual assistant layer, and wherein the second device is at least one of a Bluetooth-connectable device, a Wi-Fi-connectable device, a Wi-Fi server, or an Internet of Things device.

Item 3. The method of item 2, wherein the first device including the virtual assistant layer is a smartphone, and the Bluetooth-connectable device is a Bluetooth-connectable headset.

Item 4. The method of item 1, wherein, for the receiving of the discovery phase signal, the first device has a scanner role, and the second device has an advertiser role, wherein, for the transmitting of the connecting phase signal and the receiving of the response to the connecting phase signal, the first device has an initiator role, and the second device has an advertiser role, and wherein, for the transmitting of the connected phase signal and the receiving of the response to the connected phase signal, the first device has a primary role, and the second device has a secondary role.

Item 5. The method of item 1, wherein, for the transmitting of the connected phase signal and the receiving of the response to the connected phase signal, the first device has a generic access profile (GAP) central role and/or a generic attribute profile (GATT) client role, and the second device has a GAP peripheral role and/or a GATT server role.

Item 6. The method of item 1, wherein, after the transmitting, from the first device, the connecting phase signal to the second device, the second device generates for output an audible tone.

Item 7. The method of item 1, wherein the second device is a Bluetooth-connectable device, and the method comprising:

after the receiving, at the first device, the response to the connected phase signal including the receiving data from the second device, transmitting from the first device a Bluetooth stack notification to a remote address.

Item 8. The method of item 1, wherein the first device includes a virtual assistant layer, the method comprising:

after the receiving, at the first device, the response to the connected phase signal including the receiving data from the second device, transmitting, from the first device, a text-to-speech conversion command to a text-to-speech converter.

Item 9. The method of item 8, wherein the transmitting, from the first device, the text-to-speech conversion command to the text-to-speech converter occurs automatically and without the virtual assistant layer receiving a verbal request.

Item 10. The method of item 1, wherein the first device includes a virtual assistant layer, the method comprising:

after the receiving, at the first device, the response to the connected phase signal including the receiving data from the second device, transmitting from the first device a virtual assistant audible announcement to the second device.

Item 11. The method of item 10, wherein the virtual assistant audible announcement confirms a connection of the first device with the second device.

Item 12. The method of item 10, wherein, after the transmitting, from the first device, the virtual assistant audible announcement to the second device, and in response to receiving, from the second device, a wake word or a summons from the second device, transmitting, from the first device, a virtual assistant acknowledgement signal to the second device.

Item 13. The method of item 12, after the transmitting, from the first device, the virtual assistant acknowledgement signal to the second device, and in response to receiving, from the second device, a command to connect to a third device, determining, by the first device, whether the third device is advertising.

Item 14. The method of item 13, wherein, in response to the determining, by the first device, that the third device is advertising, obtaining a remote address of the third device, and wherein, in response to the determining, by the first device, that the third device is not advertising, transmitting from the first device a Bluetooth stack notification to a remote address, and transmitting from the first device a virtual assistant audible announcement to the second device.

Item 15. The method of item 14, wherein, in response to the obtaining the remote address of the third device, transmitting from the first device a query/establish serial port profile (SPP) connection command to the third device.

Item 16. The method of item 15, wherein, in response to the transmitting from the first device the query/establish serial port profile (SPP) connection command to the third device, in response to receiving at the second device a connect request from the third device, and in response to transmitting from the second device a response to the connect request to the third device, receiving, at the first device, an end SPP connection command from the third device.

Item 17. The method of item 16, wherein, in response to a successful connection between the second device and the third device, transmitting from the first device a Bluetooth stack notification to a remote address, and transmitting from the first device a virtual assistant audible announcement to the second device and/or to the third device.

Item 18. The method of item 13, wherein the third device is at least one of a streaming service device or a smart display device.

Item 19. The method of item 13, comprising:

transmitting a second audible announcement including an identification of the third device.

Item 20. The method of item 1, comprising:

in response to detecting a third device attempting to connect to the first device while connecting to the second device, transmitting from the first device a second audible announcement to the second device, the second audible announcement including an identification of the third device.

Item 21. The method of item 1, comprising:

in response to a failure to connect the first device and the second device, repeating at least a portion of the method of item 1.

Item 22. The method of item 1, comprising:

in response to a failure to connect the first device and the second device, generating for output on the first device a second audible announcement identifying the second device.

Item 23. The method of item 1, comprising:

in response to a failure to connect the first device and the second device, determining whether the failure is the result of at least one of a scanning function failure, a pairing function failure, a security function failure, or an advertising function failure; and generating for output on the first device a second audible announcement identifying the failure.

Item 24. The method of item 1, comprising:

in response to determining that a strength of a signal or a data transmission rate between the first device and the second device is approaching or falling below a threshold strength or a threshold data transmission rate, generating for output on the first device a second audible announcement related to the strength or the data transmission rate.

Item 25. The method of item 24, comprising:

in response to determining that the strength of the signal or the data transmission rate between the first device and the second device is approaching or falling below the threshold strength or the threshold data transmission rate, determining if a movement of the first device or the second device is occurring.

Item 26. The method of item 25, comprising:

in response to determining that the movement of the first device or the second device is occurring, generating for output on the first device a third audible announcement suggesting a pause of the movement.

Item 27. The method of item 25, comprising:

in response to determining that the movement of the first device or the second device is occurring, determining a direction of the movement that is likely to improve the signal or the data transmission rate, and generating for output on the first device a third audible announcement suggesting movement in the direction likely to improve the signal or the data transmission rate.

Item 28. The method of item 1, wherein the transmitting and the receiving occur in accordance with a protocol consistent with at least one of Bluetooth, Wi-Fi, Internet Protocol Version 6 Over Low-Power Wireless Personal Area Networks, Bluetooth Low Energy, Global System for Mobile Communication, long range, long-term evolution, Long-Term Evolution Machine Type Communication, narrowband internet-of-things, near-field communication, Wi-Fi Peer-to-Peer, Zigbee, or Z-Wave.

Item 29. The method of item 1, comprising:

prompting a primary user profile associated with a primary user for population of a block list preventing connection of the second device associated with a secondary user profile associated with a secondary user.

Item 30. The method of item 29, wherein the primary user is an adult, and wherein the secondary user is a minor child.

Item 31. A system for connecting a first device to a second device, the system comprising:

circuitry configured to:

receive, at the first device, a discovery phase signal from the second device;

transmit, from the first device, a connecting phase signal to the second device;

receive, at the first device, a response to the connecting phase signal from the second device;

transmit, from the first device, a connected phase signal including transmission data to the second device;

receive, at the first device, a response to the connected phase signal including receiving data from the second device; and transmit from the first device an audible announcement to the second device, the audible announcement including an identification of the first device.

Item 32. The system of item 31, wherein the first device includes a virtual assistant layer, and wherein the second device is at least one of a Bluetooth-connectable device, a Wi-Fi-connectable device, a Wi-Fi server, or an Internet of Things device.

Item 33. The system of item 32, wherein the first device including the virtual assistant layer is a smartphone, and the Bluetooth-connectable device is a Bluetooth-connectable headset.

Item 34. The system of item 31, wherein, for the receiving of the discovery phase signal, the first device has a scanner role, and the second device has an advertiser role, wherein, for the transmitting of the connecting phase signal and the receiving of the response to the connecting phase signal, the first device has an initiator role, and the second device has an advertiser role, and wherein, for the transmitting of the connected phase signal and the receiving of the response to the connected phase signal, the first device has a primary role, and the second device has a secondary role.

Item 35. The system of item 31, wherein, for the transmitting of the connected phase signal and the receiving of the response to the connected phase signal, the first device has a generic access profile (GAP) central role and/or a generic attribute profile (GATT) client role, and the second device has a GAP peripheral role and/or a GATT server role.

Item 36. The system of item 31, wherein the circuitry is configured to:

after the transmitting, from the first device, the connecting phase signal to the second device, generate for output, at the second device, an audible tone.

Item 37. The system of item 31, wherein the second device is a Bluetooth-connectable device, and wherein the circuitry is configured to:

after the receiving, at the first device, the response to the connected phase signal including the receiving data from the second device, transmit from the first device a Bluetooth stack notification to a remote address.

Item 38. The system of item 31, wherein the first device includes a virtual assistant layer, and wherein the circuitry is configured to:

after the receiving, at the first device, the response to the connected phase signal including the receiving data from the second device, transmit, from the first device, a text-to-speech conversion command to a text-to-speech converter.

Item 39. The system of item 38, wherein the transmitting, from the first device, the text-to-speech conversion command to the text-to-speech converter occurs automatically and without the virtual assistant layer receiving a verbal request.

Item 40. The system of item 31, wherein the first device includes a virtual assistant layer, and wherein the circuitry is configured to:

after the receiving, at the first device, the response to the connected phase signal including the receiving data from the second device, transmit from the first device a virtual assistant audible announcement to the second device.

Item 41. The system of item 40, wherein the virtual assistant audible announcement confirms a connection of the first device with the second device.

Item 42. The system of item 40, wherein the circuitry is configured to:

after the transmitting, from the first device, the virtual assistant audible announcement to the second device, and in response to receiving, from the second device, a wake word or a summons from the second device, transmit, from the first device, a virtual assistant acknowledgement signal to the second device.

Item 43. The system of item 42, wherein the circuitry is configured to:

after the transmitting, from the first device, the virtual assistant acknowledgement signal to the second device, and in response to receiving, from the second device, a command to connect to a third device, determine, by the first device, whether the third device is advertising.

Item 44. The system of item 43, wherein the circuitry is configured to:

in response to the determining, by the first device, that the third device is advertising, obtain a remote address of the third device, and in response to the determining, by the first device, that the third device is not advertising, transmit from the first device a Bluetooth stack notification to a remote address, and transmit from the first device a virtual assistant audible announcement to the second device.

Item 45. The system of item 44, wherein the circuitry is configured to:

in response to the obtaining the remote address of the third device, transmit from the first device a query/establish serial port profile (SPP) connection command to the third device.

Item 46. The system of item 45, wherein the circuitry is configured to:

in response to the transmitting from the first device the query/establish serial port profile (SPP) connection command to the third device, in response to receiving at the second device a connect request from the third device, and in response to transmitting from the second device a response to the connect request to the third device, receive, at the first device, an end SPP connection command from the third device.

Item 47. The system of item 46, wherein the circuitry is configured to:

in response to a successful connection between the second device and the third device, transmit from the first device a Bluetooth stack notification to a remote address, and transmit from the first device a virtual assistant audible announcement to the second device and/or to the third device.

Item 48. The system of item 43, wherein the third device is at least one of a streaming service device or a smart display device.

Item 49. The system of item 43, wherein the circuitry is configured to:

transmit a second audible announcement including an identification of the third device.

Item 50. The system of item 31, wherein the circuitry is configured to:

in response to detecting a third device attempting to connect to the first device while connecting to the second device, transmit from the first device a second audible announcement to the second device, the second audible announcement including an identification of the third device.

Item 51. The system of item 31, wherein the circuitry is configured to:

in response to a failure to connect the first device and the second device, repeat at least a portion of the steps of item 31.

Item 52. The system of item 31, wherein the circuitry is configured to:

in response to a failure to connect the first device and the second device, generate for output on the first device a second audible announcement identifying the second device.

Item 53. The system of item 31, wherein the circuitry is configured to:

in response to a failure to connect the first device and the second device, determine whether the failure is the result of at least one of a scanning function failure, a pairing function failure, a security function failure, or an advertising function failure; and generate for output on the first device a second audible announcement identifying the failure.

Item 54. The system of item 31, wherein the circuitry is configured to:

in response to determining that a strength of a signal or a data transmission rate between the first device and the second device is approaching or falling below a threshold strength or a threshold data transmission rate, generate for output on the first device a second audible announcement related to the strength or the data transmission rate.

Item 55. The system of item 54, wherein the circuitry is configured to:

in response to determining that the strength of the signal or the data transmission rate between the first device and the second device is approaching or falling below the threshold strength or the threshold data transmission rate, determine if a movement of the first device or the second device is occurring.

Item 56. The system of item 55, wherein the circuitry is configured to:

in response to determining that the movement of the first device or the second device is occurring, generate for output on the first device a third audible announcement suggesting a pause of the movement.

Item 57. The system of item 55, wherein the circuitry is configured to:

in response to determining that the movement of the first device or the second device is occurring, determine a direction of the movement that is likely to improve the signal or the data transmission rate, and generate for output on the first device a third audible announcement suggesting movement in the direction likely to improve the signal or the data transmission rate.

Item 58. The system of item 31, wherein the transmitting and the receiving occur in accordance with a protocol consistent with at least one of Bluetooth, Wi-Fi, Internet Protocol Version 6 Over Low-Power Wireless Personal Area Networks, Bluetooth Low Energy, Global System for Mobile Communication, long range, long-term evolution, Long-Term Evolution Machine Type Communication, narrowband internet-of-things, near-field communication, Wi-Fi Peer-to-Peer, Zigbee, or Z-Wave.

Item 59. The system of item 31, wherein the circuitry is configured to:

prompt a primary user profile associated with a primary user for population of a block list preventing connection of the second device associated with a secondary user profile associated with a secondary user.

Item 60. The system of item 59, wherein the primary user is an adult, and wherein the secondary user is a minor child.

Item 61. A device comprising means for performing the method of any one of items 1-30.

Item 62. A non-transitory computer-readable medium having non-transitory computer-readable instructions encoded thereon for connecting a first device to a second device that, when executed by control circuitry, cause the control circuitry to perform the method of any one of items 1-30.

While some portions of this disclosure may refer to "convention" or "conventional" examples. Any such reference is merely to provide context to the instant disclosure and does not form any admission as to what constitutes the state of the art.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for connecting a first device to a second device, the method comprising:
   receiving, at the first device, a discovery phase signal from the second device;
   transmitting, from the first device, a connecting phase signal to the second device;
   receiving, at the first device, a response to the connecting phase signal from the second device;
   transmitting, from the first device, a connected phase signal including transmission data to the second device;
   receiving, at the first device, a response to the connected phase signal including receiving data from the second device; and
   transmitting from the first device an audible announcement to the second device, the audible announcement including an identification of the first device.

2. The method of claim 1, wherein the first device includes a virtual assistant layer, and wherein the second device is at least one of a Bluetooth-connectable device, a Wi-Fi-connectable device, a Wi-Fi server, or an Internet of Things device.

3. The method of claim 2, wherein the first device including the virtual assistant layer is a smartphone, and the Bluetooth-connectable device is a Bluetooth-connectable headset.

4. The method of claim 1, wherein, for the receiving of the discovery phase signal, the first device has a scanner role, and the second device has an advertiser role,
   wherein, for the transmitting of the connecting phase signal and the receiving of the response to the connecting phase signal, the first device has an initiator role, and the second device has an advertiser role, and
   wherein, for the transmitting of the connected phase signal and the receiving of the response to the connected phase signal, the first device has a primary role, and the second device has a secondary role.

5. The method of claim 1, wherein, for the transmitting of the connected phase signal and the receiving of the response to the connected phase signal, the first device has a generic access profile (GAP) central role and/or a generic attribute profile (GATT) client role, and the second device has a GAP peripheral role and/or a GATT server role.

6. The method of claim 1, wherein, after the transmitting, from the first device, the connecting phase signal to the second device, the second device generates for output an audible tone.

7. The method of claim 1, wherein the second device is a Bluetooth-connectable device, and the method comprising:
   after the receiving, at the first device, the response to the connected phase signal including the receiving data from the second device, transmitting from the first device a Bluetooth stack notification to a remote address.

8. The method of claim 1, wherein the first device includes a virtual assistant layer, the method comprising:
   after the receiving, at the first device, the response to the connected phase signal including the receiving data from the second device, transmitting, from the first device, a text-to-speech conversion command to a text-to-speech converter.

9. The method of claim 8, wherein the transmitting, from the first device, the text-to-speech conversion command to the text-to-speech converter occurs automatically and without the virtual assistant layer receiving a verbal request.

10. The method of claim 1, wherein the first device includes a virtual assistant layer, the method comprising:
   after the receiving, at the first device, the response to the connected phase signal including the receiving data from the second device, transmitting from the first device a virtual assistant audible announcement to the second device.

11. A system for connecting a first device to a second device, the system comprising:
   circuitry configured to:
      receive, at the first device, a discovery phase signal from the second device;
      transmit, from the first device, a connecting phase signal to the second device;
      receive, at the first device, a response to the connecting phase signal from the second device;
      transmit, from the first device, a connected phase signal including transmission data to the second device;
      receive, at the first device, a response to the connected phase signal including receiving data from the second device; and
      transmit from the first device an audible announcement to the second device, the audible announcement including an identification of the first device.

12. The system of claim 11, wherein the first device includes a virtual assistant layer, and wherein the second device is at least one of a Bluetooth-connectable device, a Wi-Fi-connectable device, a Wi-Fi server, or an Internet of Things device.

13. The system of claim 12, wherein the first device including the virtual assistant layer is a smartphone, and the Bluetooth-connectable device is a Bluetooth-connectable headset.

14. The system of claim 11, wherein, for the receiving of the discovery phase signal, the first device has a scanner role, and the second device has an advertiser role,
   wherein, for the transmitting of the connecting phase signal and the receiving of the response to the connecting phase signal, the first device has an initiator role, and the second device has an advertiser role, and
   wherein, for the transmitting of the connected phase signal and the receiving of the response to the connected phase signal, the first device has a primary role, and the second device has a secondary role.

15. The system of claim 11, wherein, for the transmitting of the connected phase signal and the receiving of the response to the connected phase signal, the first device has a generic access profile (GAP) central role and/or a generic attribute profile (GATT) client role, and the second device has a GAP peripheral role and/or a GATT server role.

16. The system of claim 11, wherein the circuitry is configured to:

after the transmitting, from the first device, the connecting phase signal to the second device, generate for output, at the second device, an audible tone.

17. The system of claim 11, wherein the second device is a Bluetooth-connectable device, and wherein the circuitry is configured to:

after the receiving, at the first device, the response to the connected phase signal including the receiving data from the second device, transmit from the first device a Bluetooth stack notification to a remote address.

18. The system of claim 11, wherein the first device includes a virtual assistant layer, and wherein the circuitry is configured to:

after the receiving, at the first device, the response to the connected phase signal including the receiving data from the second device, transmit, from the first device, a text-to-speech conversion command to a text-to-speech converter.

19. The system of claim 18, wherein the transmitting, from the first device, the text-to-speech conversion command to the text-to-speech converter occurs automatically and without the virtual assistant layer receiving a verbal request.

20. The system of claim 11, wherein the first device includes a virtual assistant layer, and wherein the circuitry is configured to:

after the receiving, at the first device, the response to the connected phase signal including the receiving data from the second device, transmit from the first device a virtual assistant audible announcement to the second device.

21. The method of claim 1, wherein the first device performs text-to-speech on a device-name string identifying the first device and transmits resulting audio to the second device for playback upon connection.

22. The method of claim 21, wherein the first device automatically transmits the resulting audio to the second device for playback upon connection without the virtual-assistant layer receiving a verbal request.

* * * * *